United States Patent
Newman et al.

(10) Patent No.: US 12,185,213 B2
(45) Date of Patent: Dec. 31, 2024

(54) RAPID TRANSMISSION OF 5G/6G AND LOW-COMPLEXITY EMERGENCY MESSAGES

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(*) Notice: Subject to any disclaimer, the term of this patent is extended or adjusted under 35 U.S.C. 154(b) by 367 days.

(21) Appl. No.: 17/588,652

(22) Filed: Jan. 31, 2022

(65) Prior Publication Data

US 2022/0159442 A1     May 19, 2022

Related U.S. Application Data

(63) Continuation of application No. 17/350,039, filed on Jun. 17, 2021, now abandoned, which is a
(Continued)

(51) Int. Cl.
*H04W 4/90* (2018.01)
*H04B 17/318* (2015.01)
(Continued)

(52) U.S. Cl.
CPC ............ *H04W 4/90* (2018.02); *H04B 17/318* (2015.01); *H04L 5/0055* (2013.01);
(Continued)

(58) Field of Classification Search
CPC ............ H04B 7/18502; H04B 7/18504; H04B 7/1851; H04W 4/90; H04W 28/0268;
(Continued)

(56) References Cited

U.S. PATENT DOCUMENTS

| | | |
|---|---|---|
| 3,466,409 A | 9/1969 | Pernet |
| 3,882,449 A | 5/1975 | Bouchard |

(Continued)

FOREIGN PATENT DOCUMENTS

| | | | |
|---|---|---|---|
| CN | 101340700 A | * | 1/2009 |
| DE | 102014212898 | | 1/2016 |

(Continued)

OTHER PUBLICATIONS

"Automatic Post-Collision Braking System", Volkswagon, Retrieved from: http://www.volkswagen.co.uk/technology/braking-and-stability-systems/automatic-post-collision-braking-system Retrieved on: Oct. 31, 2016 (3 pages total).

(Continued)

*Primary Examiner* — David Q Nguyen

(57) ABSTRACT

Disclosed herein are systems and methods for improved, rapid wireless emergency communication in both advanced (5G/6G) and low-complexity (CDMA-CA) networks. Embodiments may provide improved means for preempting other non-emergency communication, delivering an emergency message with sufficient information to enable first-responders to take appropriate action even if no further communication is possible, and for establishing a privileged voice connection following the emergency message. Embodiments may include a hailing-type emergency message configured to alert a base station when the addresses of base station is unknown to the emergency node. With improved speed and reliability of emergency communication, first-responders may begin an appropriate life-saving response without delay and with knowledge of the type and location of the emergency.

12 Claims, 10 Drawing Sheets

Related U.S. Application Data continuation of application No. 16/949,284, filed on Oct. 23, 2020, now abandoned, which is a continuation of application No. 16/946,256, filed on Jun. 12, 2020, now Pat. No. 10,820,182.

(60) Provisional application No. 62/705,114, filed on Jun. 11, 2020, provisional application No. 63/023,462, filed on May 12, 2020, provisional application No. 63/009,609, filed on Apr. 14, 2020, provisional application No. 62/983,029, filed on Feb. 28, 2020, provisional application No. 62/947,812, filed on Dec. 13, 2019, provisional application No. 62/924,914, filed on Oct. 23, 2019, provisional application No. 62/861,055, filed on Jun. 13, 2019.

(51) Int. Cl.
*H04L 5/00* (2006.01)
*H04L 43/0852* (2022.01)
*H04W 72/541* (2023.01)
*H04W 74/0816* (2024.01)
*H04W 84/12* (2009.01)

(52) U.S. Cl.
CPC ....... *H04L 43/0852* (2013.01); *H04W 72/541* (2023.01); *H04W 74/0816* (2013.01); *H04W 84/12* (2013.01)

(58) Field of Classification Search
CPC ..... H04W 68/005; H04W 8/08; H04W 76/27; H04W 48/16; H04W 60/00; H04W 8/18
USPC ........ 370/328, 329, 330, 331; 455/450, 521, 455/936
See application file for complete search history.

(56) References Cited

U.S. PATENT DOCUMENTS

| | | |
|---|---|---|
| 3,952,381 A | 4/1976 | Barbe |
| 4,381,829 A | 5/1983 | Montaron |
| 4,524,287 A | 6/1985 | Brannen |
| 5,894,906 A | 4/1999 | Weber |
| 5,959,552 A | 9/1999 | Cho |
| 5,983,161 A | 11/1999 | Lemelson |
| 6,084,508 A | 7/2000 | Mai |
| 6,225,918 B1 | 5/2001 | Kam |
| 6,269,308 B1 | 7/2001 | Kodaka |
| 6,275,773 B1 | 8/2001 | Lemelson |
| 6,317,692 B2 | 11/2001 | Kodaka |
| 6,359,553 B1 | 3/2002 | Kopischke |
| 6,420,996 B1 | 7/2002 | Stopczynski |
| 6,442,485 B2 | 8/2002 | Evans |
| 6,487,500 B2 | 11/2002 | Lemelson |
| 6,496,764 B1 | 12/2002 | Wang |
| 6,597,974 B2 | 7/2003 | Roelleke |
| 6,678,590 B1 | 1/2004 | Burchfiel |
| 6,791,471 B2 | 9/2004 | Wehner |
| 6,831,572 B2 | 12/2004 | Strumolo |
| 6,996,074 B2 | 2/2006 | Garcia-Luna-Aceves |
| 7,002,947 B1 | 2/2006 | McFarland |
| 7,016,782 B2 | 3/2006 | Schiffmann |
| 7,079,508 B2 | 7/2006 | Ayyagari |
| 7,124,027 B1 | 10/2006 | Ernst |
| 7,177,294 B2 | 2/2007 | Chen |
| 7,375,627 B2 | 5/2008 | Johnson |
| 7,409,295 B2 | 8/2008 | Paradie |
| 7,660,436 B2 | 2/2010 | Chang |
| 7,667,581 B2 | 2/2010 | Fujimoto |
| 7,696,863 B2 | 4/2010 | Lucas |
| 7,797,107 B2 | 9/2010 | Shiller |
| 7,840,354 B2 | 11/2010 | Knoop |
| 7,966,127 B2 | 6/2011 | Ono |
| 7,975,798 B2 | 7/2011 | Lucas |
| 8,108,147 B1 | 1/2012 | Blackburn |
| 8,112,225 B2 | 2/2012 | Eidehall |
| 8,121,545 B2 | 2/2012 | Stahl |
| 8,238,378 B2 | 8/2012 | Benveniste |
| 8,340,883 B2 | 12/2012 | Arbitmann |
| 8,369,350 B2 | 2/2013 | Koo |
| 8,447,472 B2 | 5/2013 | Joh |
| 8,463,500 B2 | 6/2013 | Cuddihy |
| 8,504,283 B2 | 8/2013 | Aso |
| 8,520,695 B1 | 8/2013 | Rubin |
| 8,527,172 B2 | 9/2013 | Moshchuk |
| 8,538,674 B2 | 9/2013 | Breuer |
| 8,576,055 B2 | 11/2013 | Hara |
| 8,589,061 B2 | 11/2013 | Bengtsson |
| 8,639,437 B2 | 1/2014 | Caminiti |
| 8,849,515 B2 | 9/2014 | Moshchuk |
| 8,874,300 B2 | 10/2014 | Allard |
| 8,907,780 B2 | 12/2014 | Rohr |
| 8,937,893 B1 | 1/2015 | Nemavat |
| 8,948,955 B2 | 2/2015 | Zhu |
| 9,031,743 B2 | 5/2015 | Okita |
| 9,031,761 B2 | 5/2015 | Koshizen |
| 9,031,774 B2 | 5/2015 | Suk |
| 9,037,379 B2 | 5/2015 | Shin |
| 9,050,930 B2 | 6/2015 | Walsh |
| 9,108,582 B1 | 8/2015 | Kozloski |
| 9,110,169 B2 | 8/2015 | Stettner |
| 9,155,027 B1 | 10/2015 | Liu |
| 9,165,469 B2 | 10/2015 | Bowers |
| 9,199,614 B2 | 12/2015 | Ito |
| 9,210,722 B2 | 12/2015 | Batsuuri |
| 9,250,324 B2 | 2/2016 | Zeng |
| 9,318,023 B2 | 4/2016 | Moshchuk |
| 9,378,601 B2 | 6/2016 | Ricci |
| 9,398,594 B2 | 7/2016 | Benveniste |
| 9,415,658 B1 | 8/2016 | Makkar |
| 9,421,400 B2 | 8/2016 | Oakes |
| 9,469,297 B2 | 10/2016 | Akiyama |
| 9,701,307 B1 | 7/2017 | Newman |
| 9,721,400 B1 | 8/2017 | Oakes, III |
| 9,788,182 B2 | 10/2017 | Lee |
| 9,896,093 B2 | 2/2018 | Vollmer |
| 9,896,096 B2 | 2/2018 | Newman |
| 10,335,962 B1 | 7/2019 | Rosenberg |
| 10,405,340 B2 | 9/2019 | Ma |
| 12,004,111 B2 * | 6/2024 | Shan ................ H04W 4/40 |
| 12,028,770 B2 * | 7/2024 | Yao ................ H04W 24/08 |
| 2002/0037014 A1 | 3/2002 | Myojo |
| 2002/0097694 A1 | 7/2002 | Strusaker |
| 2002/0198632 A1 | 12/2002 | Breed |
| 2003/0014165 A1 | 1/2003 | Baker |
| 2003/0067219 A1 | 4/2003 | Seto |
| 2003/0080543 A1 | 5/2003 | Takagi |
| 2003/0086437 A1 | 5/2003 | Benveniste |
| 2003/0114113 A1 | 6/2003 | Komprobst |
| 2003/0193889 A1 | 10/2003 | Jacobsen |
| 2004/0030498 A1 | 2/2004 | Knoop |
| 2004/0100936 A1 | 5/2004 | Liu |
| 2004/0117081 A1 | 6/2004 | Mori |
| 2004/0120292 A1 | 6/2004 | Trainin |
| 2004/0122578 A1 | 6/2004 | Isaji |
| 2004/0193374 A1 | 9/2004 | Hae |
| 2004/0196864 A1 | 10/2004 | Benveniste |
| 2004/0252863 A1 | 12/2004 | Chang |
| 2005/0058151 A1 | 3/2005 | Yeh |
| 2005/0060069 A1 | 3/2005 | Breed |
| 2005/0071071 A1 | 3/2005 | Nagata |
| 2005/0107955 A1 | 5/2005 | Isaji |
| 2005/0114000 A1 | 5/2005 | Cashier |
| 2005/0131646 A1 | 6/2005 | Camus |
| 2005/0206142 A1 | 9/2005 | Prakah-Asante |
| 2005/0271076 A1 | 12/2005 | Ganti |
| 2005/0280520 A1 | 12/2005 | Kubo |
| 2006/0028984 A1 | 2/2006 | Wu |
| 2006/0029073 A1 | 2/2006 | Cervello |
| 2006/0050661 A1 | 3/2006 | Shim |
| 2006/0085131 A1 | 4/2006 | Yopp |
| 2006/0091654 A1 | 5/2006 | De Mersseman |
| 2006/0109094 A1 | 5/2006 | Prakah-Asante |

(56) References Cited

U.S. PATENT DOCUMENTS

| | | |
|---|---|---|
| 2006/0121877 A1 | 6/2006 | Raghuram |
| 2006/0125616 A1 | 6/2006 | Song |
| 2006/0227802 A1 | 10/2006 | Du |
| 2006/0282218 A1 | 12/2006 | Urai |
| 2007/0066276 A1 | 3/2007 | Kuz |
| 2007/0078600 A1 | 4/2007 | Fregene |
| 2007/0080825 A1 | 4/2007 | Shiller |
| 2007/0112516 A1 | 5/2007 | Taniguchi |
| 2007/0123208 A1 | 5/2007 | Batta |
| 2007/0125588 A1 | 6/2007 | Akgun |
| 2007/0143613 A1 | 6/2007 | Sitch |
| 2007/0159319 A1 | 7/2007 | Maldonado |
| 2007/0189239 A1 | 8/2007 | Lim |
| 2007/0213029 A1 | 9/2007 | Edney |
| 2007/0219672 A1 | 9/2007 | Fehr |
| 2007/0282530 A1 | 12/2007 | Meister |
| 2008/0090547 A1 | 4/2008 | Struhsaker |
| 2008/0097699 A1 | 4/2008 | Ono |
| 2008/0130528 A1 | 6/2008 | Ennai |
| 2008/0144493 A1 | 6/2008 | Yeh |
| 2008/0208408 A1 | 8/2008 | Arbitmann |
| 2008/0300755 A1 | 12/2008 | Madau |
| 2008/0319610 A1 | 12/2008 | Oechsle |
| 2009/0018740 A1 | 1/2009 | Noda |
| 2009/0066492 A1 | 3/2009 | Kubota |
| 2009/0074249 A1 | 3/2009 | Moed |
| 2009/0076702 A1 | 3/2009 | Arbitmann |
| 2009/0143951 A1 | 6/2009 | Takahashi |
| 2009/0157247 A1 | 6/2009 | Sjogren |
| 2009/0182465 A1 | 7/2009 | Wilke |
| 2009/0184862 A1 | 7/2009 | Stayton |
| 2009/0192683 A1 | 7/2009 | Kondou |
| 2009/0292468 A1 | 11/2009 | Wu |
| 2009/0299593 A1 | 12/2009 | Borchers |
| 2009/0299857 A1 | 12/2009 | Brubaker |
| 2009/0322500 A1 | 12/2009 | Chatterjee |
| 2009/0326796 A1 | 12/2009 | Prokhorov |
| 2010/0054146 A1 | 3/2010 | Rudland |
| 2010/0093304 A1 | 4/2010 | Miyoshi |
| 2010/0110888 A1 | 5/2010 | Park |
| 2010/0131635 A1 | 5/2010 | Gunduzhan |
| 2010/0150074 A1 | 6/2010 | Yamada |
| 2010/0179760 A1 | 7/2010 | Petrini |
| 2010/0191759 A1 | 7/2010 | Li |
| 2010/0202378 A1 | 8/2010 | Youn |
| 2010/0254365 A1 | 10/2010 | Benveniste |
| 2010/0256852 A1 | 10/2010 | Mudalige |
| 2010/0305857 A1 | 12/2010 | Byrne |
| 2011/0035116 A1 | 2/2011 | Ieda |
| 2011/0059721 A1 | 3/2011 | Chen |
| 2011/0106361 A1 | 5/2011 | Staempfle |
| 2011/0178710 A1 | 7/2011 | Pilutti |
| 2011/0188416 A1 | 8/2011 | Faccin |
| 2011/0210872 A1 | 9/2011 | Molander |
| 2011/0238987 A1 | 9/2011 | Kherani |
| 2011/0295464 A1 | 12/2011 | Zagorski |
| 2011/0307139 A1 | 12/2011 | Caminiti |
| 2012/0015622 A1 | 1/2012 | Kuz |
| 2012/0069746 A1 | 3/2012 | Park |
| 2012/0078472 A1 | 3/2012 | Neal |
| 2012/0082139 A1 | 4/2012 | Kwak |
| 2012/0083947 A1 | 4/2012 | Anderson |
| 2012/0083960 A1 | 4/2012 | Zhu |
| 2012/0092208 A1 | 4/2012 | Le Mire |
| 2012/0101713 A1 | 4/2012 | Moshchuk |
| 2012/0130561 A1 | 5/2012 | Chiang |
| 2012/0130629 A1 | 5/2012 | Kim |
| 2012/0143488 A1 | 6/2012 | Othmezouri |
| 2012/0155397 A1 | 6/2012 | Shaffer |
| 2012/0208488 A1 | 8/2012 | Park |
| 2012/0230205 A1 | 9/2012 | An |
| 2012/0230262 A1 | 9/2012 | Benveniste |
| 2012/0235853 A1 | 9/2012 | Takeuchi |
| 2012/0287849 A1 | 11/2012 | Wilczewski |
| 2012/0289185 A1 | 11/2012 | Leung |
| 2012/0330542 A1 | 12/2012 | Hafner |
| 2013/0030651 A1 | 1/2013 | Moshchuk |
| 2013/0030686 A1 | 1/2013 | Morotomi |
| 2013/0052985 A1 | 2/2013 | Tujkovic |
| 2013/0054128 A1 | 2/2013 | Moshchuk |
| 2013/0111044 A1 | 5/2013 | Cherian |
| 2013/0128786 A1 | 5/2013 | Sultan |
| 2013/0162479 A1 | 6/2013 | Kelly |
| 2013/0166150 A1 | 6/2013 | Han |
| 2013/0279392 A1 | 10/2013 | Rubin |
| 2013/0279393 A1 | 10/2013 | Rubin |
| 2013/0279491 A1 | 10/2013 | Rubin |
| 2013/0303104 A1 | 11/2013 | Venkatachalam |
| 2013/0336113 A1 | 12/2013 | Okuyama |
| 2014/0016475 A1 | 1/2014 | Zhou |
| 2014/0032049 A1 | 1/2014 | Moshchuk |
| 2014/0039786 A1 | 2/2014 | Schleicher |
| 2014/0049646 A1 | 2/2014 | Nix |
| 2014/0070980 A1 | 3/2014 | Park |
| 2014/0139366 A1 | 5/2014 | Moses |
| 2014/0141742 A1 | 5/2014 | Slow |
| 2014/0142798 A1 | 5/2014 | Guarnizo |
| 2014/0156157 A1 | 6/2014 | Johnson |
| 2014/0207344 A1 | 7/2014 | Ihlenburg |
| 2014/0229519 A1 | 8/2014 | Dietrich |
| 2014/0269383 A1 | 9/2014 | He |
| 2014/0273914 A1 | 9/2014 | Mechaley |
| 2014/0379167 A1 | 12/2014 | Flehmig |
| 2015/0003251 A1 | 1/2015 | Shaffer |
| 2015/0046078 A1 | 2/2015 | Biess |
| 2015/0063227 A1 | 3/2015 | Chaponniere |
| 2015/0085119 A1 | 3/2015 | Dagan |
| 2015/0146648 A1 | 5/2015 | Viger |
| 2015/0160338 A1 | 6/2015 | Bageshwar |
| 2015/0166062 A1 | 6/2015 | Johnson |
| 2015/0239413 A1 | 8/2015 | Kozloski |
| 2015/0249515 A1 | 9/2015 | Wu |
| 2015/0262487 A1 | 9/2015 | Cazanas |
| 2015/0264538 A1 | 9/2015 | Klang |
| 2015/0271137 A1 | 9/2015 | Seok |
| 2015/0289164 A1 | 10/2015 | Seok |
| 2015/0307097 A1 | 10/2015 | Steinmeyer |
| 2015/0336574 A1 | 11/2015 | Akiyama |
| 2015/0336579 A1 | 11/2015 | Yoshizawa |
| 2015/0340763 A1 | 11/2015 | Stepanenko |
| 2016/0029197 A1 | 1/2016 | Gellens |
| 2016/0035155 A1 | 2/2016 | Rice |
| 2016/0044693 A1* | 2/2016 | Sun .................. H04W 4/90 370/336 |
| 2016/0050686 A1 | 2/2016 | Krishnamoorthi |
| 2016/0071417 A1 | 3/2016 | Lewis |
| 2016/0103218 A1 | 4/2016 | Mandava |
| 2016/0105784 A1 | 4/2016 | Gellens |
| 2016/0107609 A1 | 4/2016 | Sogabe |
| 2016/0119959 A1 | 4/2016 | Jung |
| 2016/0121887 A1 | 5/2016 | Jeon |
| 2016/0125746 A1 | 5/2016 | Kunzi |
| 2016/0163199 A1 | 6/2016 | Chundrlik |
| 2016/0167671 A1 | 6/2016 | Offenhaeuser |
| 2016/0198493 A1 | 7/2016 | Lin |
| 2016/0200318 A1 | 7/2016 | Parikh |
| 2016/0200319 A1 | 7/2016 | Nemoto |
| 2016/0200320 A1 | 7/2016 | Nemoto |
| 2016/0200321 A1 | 7/2016 | Yamada |
| 2016/0236638 A1 | 8/2016 | Lavie |
| 2016/0239921 A1 | 8/2016 | Bray |
| 2016/0254691 A1 | 9/2016 | Koo |
| 2016/0255530 A1 | 9/2016 | Li |
| 2016/0288799 A1 | 10/2016 | Nguyen Van |
| 2016/0345362 A1 | 11/2016 | Lee |
| 2017/0019933 A1 | 1/2017 | Zhao |
| 2017/0026151 A1 | 1/2017 | Adachi |
| 2017/0043768 A1 | 2/2017 | Prokhorov |
| 2017/0055141 A1 | 2/2017 | Kim |
| 2017/0127259 A1 | 5/2017 | Miner |
| 2017/0148235 A1 | 5/2017 | Yakub |
| 2017/0164371 A1 | 6/2017 | Kim |
| 2017/0171690 A1* | 6/2017 | Kim .................. H04L 67/125 |
| 2017/0236340 A1 | 8/2017 | Hagan, Jr. |

(56) References Cited

U.S. PATENT DOCUMENTS

| | | |
|---|---|---|
| 2017/0325214 A1 | 11/2017 | Lu |
| 2017/0330457 A1 | 11/2017 | Bhalia |
| 2017/0337813 A1 | 11/2017 | Taylor |
| 2017/0353226 A1 | 12/2017 | HomChaudhuri |
| 2018/0054841 A1 | 2/2018 | Li |
| 2018/0076992 A1 | 3/2018 | Nabetani |
| 2018/0084587 A1 | 3/2018 | Noor |
| 2018/0113476 A1 | 4/2018 | Giles |
| 2018/0146359 A1 | 5/2018 | Pawar |
| 2019/0008345 A1 | 1/2019 | Schmidt |
| 2019/0025842 A1 | 1/2019 | Kim |
| 2019/0141507 A1 | 5/2019 | Wang |
| 2019/0150198 A1 | 5/2019 | Sun |
| 2019/0158257 A1 | 5/2019 | Sano |
| 2019/0159284 A1 | 5/2019 | Noor |
| 2019/0166244 A1 | 5/2019 | Ravichandran |
| 2019/0188997 A1 | 6/2019 | Gilson |
| 2019/0239040 A1 | 8/2019 | Va |
| 2020/0120470 A1 | 4/2020 | Arshad |
| 2020/0205199 A1 | 6/2020 | Newman |

FOREIGN PATENT DOCUMENTS

| | | |
|---|---|---|
| EP | 0136553 A2 | 4/1985 |
| TR | 201901757 A2 * | 4/2019 |
| WO | 2006106459 | 10/2006 |
| WO | 2015070087 | 5/2015 |

OTHER PUBLICATIONS

"Emergency", OnStar, Retrieved from: https://www.onstar.com/us/en/services/emergency.html Retrieved on: Nov. 9, 2016 (4 pages total).

Emison, J. Kent, "Post-collision fuel-fed fires.", Apr. 1, 2995, The Free Library, Retrieved Nov. 9, 2016, Retrieved from: https://www.thefreelibrary.com/Post-collision+fuel-fed+fires.-a016859548 (5 pages).

Wei Ye, An Energy-Efficient MAC Protocol for Wireless Sensor Networks, 2002, https://www.isi.edy/~johnh/PAPERS/Ye02a.pdf.

Jung Il Choi, Granting Silence to Avoid Wireless Collisions, 2010, https://sing.stanford,edu/pubs/icnp10-gts.pdf.

James M. Westall, Csma/Ca, 2016, https://people.cs.clemson.edu/~westall/851/802.11/802_CSMA_CA.pdf.

* cited by examiner

FIG. 17

| Node | F C | D | R A | T A | LAT LON SPEED DIRECTION PHONE NAME | C S |
|---|---|---|---|---|---|---|
| Int. | | | | | INTERFERENCE-1 | |
| | | | | INTERFERENCE-2 | | |
| | | | INTERFERENCE-3 | | | |

RAPID TRANSMISSION OF 5G/6G AND LOW-COMPLEXITY EMERGENCY MESSAGES

PRIORITY CLAIMS AND RELATED APPLICATIONS

This application is a continuation of U.S. patent application Ser. No. 17/350,039, entitled "Wireless Protocols for Emergency Message Transmission", filed Jun. 17, 2021, which is a continuation of U.S. patent application Ser. No. 16/949,284, entitled "Wireless Protocol for Emergency Message Transmission", filed Oct. 23, 2020, which is a continuation of U.S. patent application Ser. No. 16/946,256, entitled "Wireless Protocol for Emergency Message Transmission", filed Jun. 12, 2020, which claims the benefit of U.S. Provisional Patent Application Ser. No. 62/861,055, entitled "Rapid Wireless Communication for Vehicle Collision Mitigation", filed Jun. 13, 2019, and U.S. Provisional Patent Application No. 62/924,914, entitled "Wireless Protocol for Improved Throughput and Fairness", filed Oct. 23, 2019, and U.S. Provisional Patent Application No. 62/947,812, entitled "Short Pre-RTS Packets for Wireless Collision Avoidance", filed Dec. 13, 2019, and U.S. Provisional Patent Application No. 62/983,029, entitled "Short RTS Messages for Rapid Wireless Communication", filed Feb. 28, 2020, and U.S. Provisional Patent Application No. 63/009,609, entitled "Managed Transmission of Wireless DAT Messages", filed Apr. 14, 2020, and U.S. Provisional Patent Application No. 63/023,462, entitled "Wireless Protocols for Emergency Message Transmission", filed May 12, 2020, and U.S. Provisional Patent Application No. 62/705,114, entitled "Wireless Protocols for Emergency Message Transmission", filed Jun. 11, 2020, all of which are hereby incorporated by reference in their entireties.

This application is also related to U.S. Pat. No. 9,896,096, issued Feb. 20, 2018, entitled "Systems and Methods for Hazard Mitigation" and U.S. patent application Ser. No. 16/148,390, filed Oct. 1, 2018, entitled "Blind Spot Potential-Hazard Avoidance System", and U.S. patent application Ser. No. 16/503,020, filed Jul. 3, 2019, entitled "Rapid Wireless Communication for Vehicle Collision Mitigation", U.S. patent application Ser. No. 16/422,498, filed Oct. 17, 2019, entitled "Identification and Localization of Mobile Robots", and U.S. patent application Ser. No. 16/698,011, filed Nov. 13, 2019, entitled "Wireless Message Collision Avoidance with High Throughput", and U.S. patent application Ser. No. 16/723,198, filed Dec. 20, 2019, entitled "Short Pre-RTS Packets for Wireless Collision Avoidance", and U.S. patent application Ser. No. 16/819,546, filed Mar. 16, 2020, entitled "Short RTS Messages for Rapid Wireless Communication", and U.S. patent application Ser. No. 16/875,419, filed May 15, 2020, entitled "Managed Transmission of Wireless DAT Messages", the contents of which are incorporated herein by reference in their entireties.

FIELD OF THE INVENTION

The invention relates to systems and methods for minimizing delays in transmitting emergency messages on legacy and advanced wireless networks.

BACKGROUND OF THE INVENTION

In 5G and 6G networks as well as low-complexity CDMA networks, a user attempting to transmit an emergency message must perform a series of steps with unavoidable delays. In many situations, such as an imminent collision in traffic, such delays may cost lives. What is needed is a procedure for users to transmit emergency messages as soon as possible after detecting the emergency condition.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, a local area network (LAN) comprises a base station in signal communication with a plurality of nodes, wherein each node is configured to: detect an emergency event, detect a triggering event, wait a listening interval, and transmit an emergency message to the base station; and the listening interval is one or more of: less than one SIFS in length, a SIFS being an amount of time that the base station delays before sending a CTS message; less than one PIFS in length, a PIFS being an amount of time that a base station delays between polling messages; and less than one DIFS in length, a DIFS being an amount of time that a node delays before sending an RTS message.

In a second aspect, a method for responding to an emergency event comprises detecting the emergency event, then detecting a triggering event, then waiting a listening interval, then transmitting an emergency message.

In a third aspect, a local area network comprises a base station in signal communication with a plurality of nodes, wherein each node is configured to detect an emergency event, detect a triggering event, wait a listening interval, and transmit an emergency message to the base station; and the base station is configured to receive the emergency message, transfer the emergency message or data derived therefrom to a Public Safety Answering Point (PSAP), and transmit a reply to the node that transmitted the emergency message, wherein the reply begins less than one DIFS after the emergency message ends.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 17 is a schematic showing an exemplary emergency message and interference, according to some embodiments.

Like reference numerals refer to like elements throughout.

DETAILED DESCRIPTION

Figure 1:
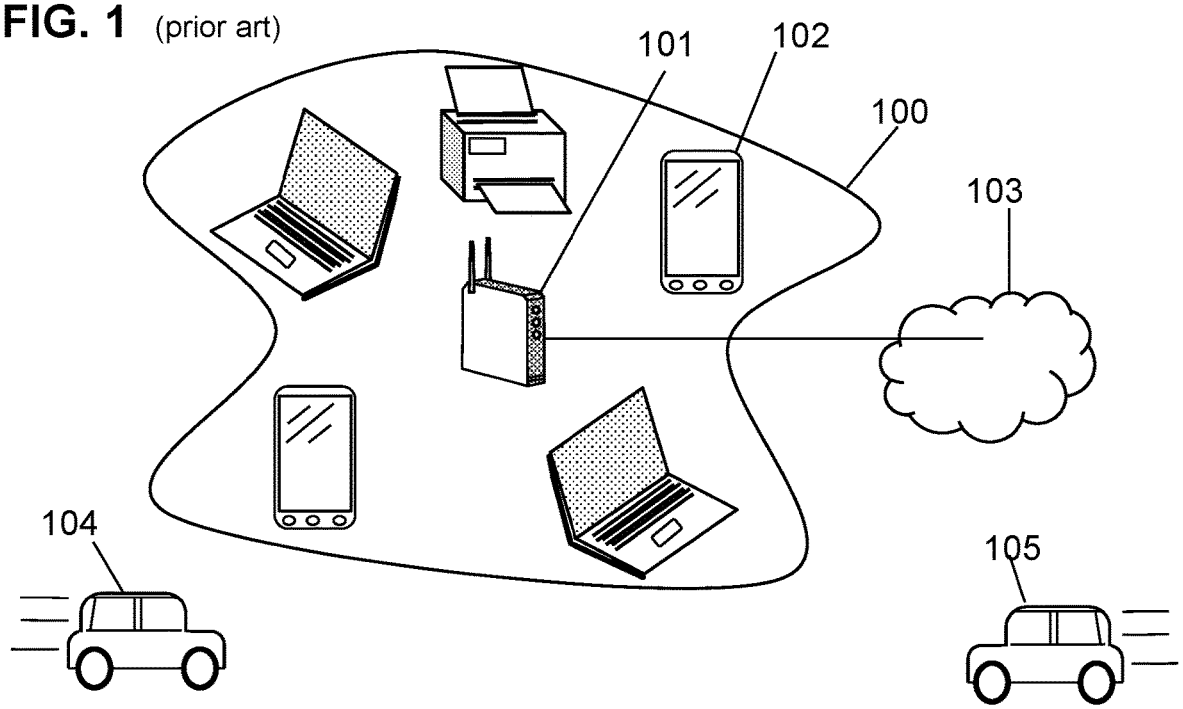
FIG. 1 is a schematic sketch of a LAN, according to prior art.

Systems and methods are disclosed herein (the "systems" and "methods", also occasionally termed "embodiments" or "arrangements", generally according to present principles) that can provide urgently needed protocols for rapid transmission of emergency messages, according to some embodiments. The systems and methods may include a local area network (LAN) including a base station in signal communication with a plurality of nodes, wherein each node is configured to detect an emergency event, detect a triggering event, wait a listening interval, and then transmit an emergency message to the base station. In some embodiments, the emergency node may be configured to transmit the emergency message so as to preempt non-emergency messages from other messages and/or messages from the base station. In some embodiments, the emergency node may detect the emergency event, and then may begin transmitting as soon as the channel is clear, for example by transmitting the emergency message without an interframe space, or alternatively after a brief delay less than one SIFS. In that case, the triggering event is the determination that the channel is clear, and the listening time is either zero time or a brief interframe space less than one SIFS. By transmitting less than one SIFS after the end of a previous message, the emergency node may thereby commandeer the communication channel before the base station or other nodes can begin transmissions, since they are obligated to wait at least one SIFS before transmitting. Alternatively, the emergency node may wait a PIFS, thereby preempting other nodes' RTS messages but not preempting the base station or node messages other than RTS messages. The emergency node may then transmit the emergency message if the base station and other stations have not started transmitting at that time. Embodiments may include emergency messages that include or are preceded by an interval of unmodulated carrier signal. Embodiments may include a CTS message (or equivalent message) transmitted by the base station, that includes a Duration field that establishes a Reserve or contention-free period, thereby allowing the emergency node to transmit emergency data without contention. Embodiments may include a CTS message (or equivalent message) that indicates that an emergency communication is in progress, thereby alerting other nodes in the LAN. Embodiments may include transmitting, by the emergency node, an initial emergency message and then transmitting follow-on messages which may include digitized voice messages. Embodiments may include a message, transmitted by an emergency node, indicating that the emergency node is finished transmitting emergency messages. Embodiments may include an initial emergency message which may include emergency data, such as the location of the emergency and/or an emergency type code and/or a code indicating a type of assistance needed, among other things. The digitized voice message may include voice or realtime sonic data exchanged between a person at the emergency node and a person at a PSAP (Public Safety Answering Point). Embodiments may include messages, sent by the base station to the emergency node, instructing the emergency node to retransmit the emergency message or to transmit a follow-on message. In some embodiments, the systems and methods disclosed herein may enable rapid delivery of emergency messages with high reliability for both modern and legacy nodes, in LANs employing advanced networking such as 5G and 6G and subsequent technologies.

Examples below are mainly based on CSMA/CA (carrier-sense multiple-access with collision avoidance) as defined in the various IEEE 802.11 protocols for wireless messaging; however, embodiments of the disclosed systems and methods may be beneficially applicable to other wireless communication protocols as well. Further enhancements and variations not specifically discussed may also benefit from the disclosed systems and methods, as will be recognized by one of ordinary skill in the art given this disclosure. As used herein, a "LAN" or Local Area Network includes a base station and a plurality of nodes. Each "node" is a device capable of transmitting and receiving wireless messages, typically in service to a user application such as a mobile phone or a computer or a vehicle equipped with a transmitter and a receiver. The "base station" (also called an access point) is similarly equipped and is, typically, connected to a larger network such as the Internet. The base station is typically responsible for managing the LAN, by sending "beacon" messages and other messages to the nodes of the LAN to direct the communications. Typically, the nodes of a LAN communicate only with the base station, not with each other. The nodes may compete with each other for an opportunity to transmit data. For example, a node may transmit an RTS (request-to-send) message to the base station, the base station may reply with a CTS (clear-to-send) message, the node may then transmit its DAT (data) message, after which the base station may reply with an ACK (acknowledgement) message after receiving the DAT. A message is "received" if the intended recipient detects it and decodes it and determines that an FCS (Frame Check Sequence or CDC code or equivalent) in the message is correct, thereby determining that the message is not collided or corrupted. If the FCS is not correct, the message is "detected" but not "received", as used herein. In some cases, however, portions of a corrupted message may be decoded and recovered, as discussed below. A portion of a message is "decodable" if the transmitted information can be determined from the as-received signal. A message portion may be decodable if the portion contains no illegal modulation and no illegal values when demodulated. Message portions that are concurrent with another transmission are generally not decodable, while message portions that do not overlap with another transmission are generally decodable, depending on signal levels and noise, etc.

The nodes typically compete for access to the communication channel. If a second node wishes to transmit while the base station or a first node is already transmitting, the second node is obligated to "backoff" by waiting for a waiting time plus a randomly-selected portion of a "contention window" before again attempting to communicate. "Random" and "pseudorandom" are treated as equivalent herein. Backoff delays are intended to avoid a "collision" or interference between two simultaneous messages on the same channel, which generally renders both messages unintelligible. Each node may be configured to refrain from transmitting for a "Reserve" interval (also called a NAV or contention-free interval) following an RTS or CTS message, thereby avoiding a collision with subsequent messages. A "hidden" node, as viewed by a first node, is a second node of the LAN that is too far away from the first node to detect signals from the first node, and likewise the first node usually cannot detect signals from the second node. All nodes in a LAN can detect communications from the base station, and the base station can detect communications from all of the nodes in the LAN; hence none of the nodes is hidden as viewed by the base station. The number of hidden nodes depends on their spatial distribution, their transmitter power, their modulation rate, any intervening absorbers or scatterers, and other factors. The "hidden node problem" is a tendency for two nodes that are hidden from each other to transmit messages that collide. The Reserve state, imposed by an RTS or CTS message based on a Duration datum in the message, causes the nodes to refrain from transmitting while another node completes its communication, thereby largely resolving the hidden node problem, although the RTS message itself remains vulnerable. Embodiments may include nodes configured to transmit emergency messages with increased, or maximum, transmitter power and/or with a modified, or reduced, modulation frequency, and/or with other adaptations to increase the range or clarity of the emergency message and reduce the number of hidden nodes. Embodiments may include a base station configured to waive requirements that the base station normally imposes on non-emergency nodes, such as encryption and password requirements, access and authentication protocols, and the like. Embodiments may include a base station configured to recognize an emergency message transmitted by an unknown node, which is not a member of the base station's LAN, and to decode the message in realtime, and to convey the emergency message to a PSAP without delay and without imposing any impediment or requirement on the emergency node. Throughout the examples, a node or base station may be described as "listening" for a message or "seeing" interference; such terms are euphemisms for detecting wireless signals. Likewise the nodes or base station may "know" something, meaning that the entity has, contains, stores, or has received or generated the relevant information. Wireless "traffic density" is a measure of the fraction of time the wireless channel is occupied by messages. In examples, vehicular traffic is not to be confused with wireless traffic, nor vehicle collisions with wireless message collisions; hence the terms "vehicle collision" and "message collision" and the like may be used to avoid confusion.

Various predetermined time intervals are generally provided or determined by the base station. The contention window used for determining backoff delays may be divided into a plurality of "slots" or "time slots" of predetermined length. For example, each slot may correspond to the time required to transmit a small number of bytes, such as 6 or 10 or 14 bytes, of transmitted data at a particular modulation rate. Alternatively, each slot may be the amount of time required for a signal to travel from a node to the base station and be received there, or alternatively the round-trip travel time including receiver lag, or other interval determined by the base station. A time slot may be as short as 1 to 5 microseconds, or shorter, in a compact or high-frequency LAN with high modulation rates, and may be as long as 10 or 20 or 100 microseconds, or longer, for an extended LAN or for slow modulation rates. A blank interval or "interframe space" with no transmission is generally provided between messages, thereby demarking message endings. The interframe space also provides time for nodes to detect interfering signals before transmitting the next message, thereby avoiding collisions. For example, a node wishing to transmit an RTS message is typically obligated to monitor the channel for a relatively long interframe space called a "DIFS", and then may transmit if no signals are detected during that listening time. The base station, on the other hand, listens for a shorter interval called a "SIFS" before transmitting. Since a SIFS is shorter than a DIFS, this allows the base station to begin transmitting before the node can transmit, and thereby enables the base station to keep control of the networking activity. Meanwhile the preempted node is required to perform a backoff delay before trying again. Another predetermined interval is the "PIFS", which is longer than a SIFS but shorter than a DIFS, thereby allowing further flexibility for the base station to manage the activity of the LAN such as polling. In examples below, an additional space called a "TIFS" (tiny interframe space) is introduced, which is shorter than a SIFS. Also, a zero-length interframe space, or "ZIFS", represents substantially zero time between messages. Symbolically, DIFS>PIFS>SIFS>TIFS>ZIFS=0. In examples, SIFS equals one slot, PIFS equals two slots, and DIFS equals three slots, TIFS may be any length less than one SIFS and greater than zero, while ZIFS equals zero time; however other lengths are possible. Typically the base station determines the sizes of these interframe spaces according to the current modulation rate, and may inform the nodes of such determination using, for example, beacon messages. In examples, an emergency node may transmit an emergency message after a triggering event plus a listening time, during which the emergency node may determine that the channel is clear. Alternatively, the emergency node may have already determined that the channel is clear before the emergency event is detected, in which case the listening time may be zero. Examples of listening times include zero time, one SIFS, a fraction of a SIFS (that is, a TIFS), a PIFS, a DIFS, an interval shorter that a DIFS, a time corresponding to one bit or several bits of data, or to one byte or several bytes of data, or to one slot or several slots. Time may be measured in slots or microseconds or bytes or bits or words or symbols (that is, the time required to transmit the bits or bytes or words or symbols at a particular modulation rate) or other units as suitable. In examples, a byte is eight bits. When bytes or bits are numbered in examples, the numbering starts with 1 rather than 0, for clarity. Also, for clarity, bit sequences are listed in regular order, as opposed to reverse order. "Several" means more than one and less than eight.

As used herein, a "wireless message" is information transmitted by radio-frequency waves. In reference to wireless messages, "send" means "transmit", and "listen" means "detect or attempt to detect" or "be in a state to receive". A message is "sent to" a specific intended recipient if the address (such as the MAC address) of the intended recipient is included in the message, usually in a Receiver Address field. On the other hand, a "hailing" message is a message with a Receiver Address field of zero, or other value predetermined by convention. In examples, the wireless messages may include a Preamble of alternating "0" and "1" bits in binary, an arrangement that assists the receiver electronics to adjust the receiver timebase for optimal reception of the rest of the message. The messages may include an SFD (Start Frame Delimiter) such as the bits "11" following the alternating "0" and "1" bits of the Preamble, thereby indicating the end of the Preamble and the start of the rest of the message. "Control" type messages include RTS, CTS, and ACK messages, whereas "data" type messages include DAT messages. The base station may also transmit Management type messages and Extension type messages, which are various messages for controlling the LAN. The time at which a message or interference or interval stops may be termed an "end" or "ending" or "ending time" of the message or interference or interval. "Barging-in" means beginning a transmission after a delay time less than that required for non-emergency transmissions; barging-in thereby enables an emergency node to preempt the other nodes. A "sequence chart" is a chart showing items, such as messages or intervals, sequentially in time, resembling an oscilloscope trace or a logic analyzer display. A wireless communication may be termed a "packet", a "message", or a "frame" herein. A "beacon" is a management message send by a base station. A "channel" is a frequency band used for wireless communication. "Collided", "corrupted", "garbled" and equivalent terms may be used to describe messages affected by interference. A message is "corrupted" if one or more bits of the message have been altered. The message may include a Frame Check Sequence or other code that enables bit-level alterations to be detected by the receiver or receiving processor. A "carrier signal" is a radio-frequency signal on a frequency channel, usually indicating that a message is in progress or is imminent on that channel. An "emergency message" is a wireless message that indicates that an emergency event has occurred and/or that requests immediate assistance. An "emergency node" is a node transmitting an emergency message. An "emergency event" is a determination by the emergency node that an emergency has occurred or is imminent. For example, an autonomous vehicle may determine that a vehicle collision is imminent, or a medical health monitor may sense that a medical emergency is in progress. Alternatively, a human may initiate the emergency message by dialing 911 (or whatever the local emergency call-code is), or otherwise taking some physical or verbal action to cause the emergency message to be sent. A "triggering event" is a particular time or event after which the emergency node may transmit an emergency message; examples include detection of the emergency event itself, or detection of the end of a wireless message, or detection of the end of a period of noise or interference which thereby indicates that the communication channel is free. The emergency message or messages may include a data transmission followed by one or more acoustical or "voice" encoded transmissions conveying digitally rendered speech sounds. "Artificial Intelligence" or AI is computer-assisted decision-making, usually involving advanced algorithms for correlating large quantities of data. Networking technologies may be referred to according to a technology generation abbreviation, such as "5G" referring to fifth-generation wireless networking, "6G" to sixth-generation technology, and so forth.

An advantage of the improvements in emergency message transmission, as disclosed herein, may be that emergency messages may be rapidly and reliably transmitted under emergency conditions, even with high-density competing traffic and even when the emergency node is not attached to any particular LAN. Another advantage may be that information sufficient to guide first-responders may be included in an initial data message. Another advantage may be that multiple sequential emergency messages, containing further details or sound related to the emergency, may be provided. Another advantage may be that means may be included for avoiding interference from other nodes in the LAN. Another advantage may be that the emergency node may preempt the other nodes by transmitting the emergency message with a listening time of one PIFS or a listening time of more than one SIFS and less than one DIFS. Likewise the node may preempt the base station as well by transmitting after a listening time of less than one SIFS. Another advantage may be that the base station, by providing a CTS or equivalent message responsive to each emergency message, may extend a protected Reserve state for the duration of a series of emergency messages, thereby excluding other nodes from transmitting on that channel. In addition, the base station may cause the emergency node to retransmit the emergency message, or to transmit a follow-on message, or to conclude contention-free operation; moreover, the base station may determine which response to elicit from the emergency node by sending predetermined reply messages following the emergency message. Other advantages and benefits are discussed in the examples below.

Turning now to the figures, FIG. 1 is a sketch showing a LAN 100 such as may be found in an office building or an instrumented home for example, according to prior art. The LAN 100 includes a base station 101 shown as a modem, and a plurality of nodes 102 rendered as cell phones and computers etc. The base station 101 is connected to the Internet 103. External nodes, which are not members of the LAN, are shown as passing vehicles 104-105.

Figure 2:
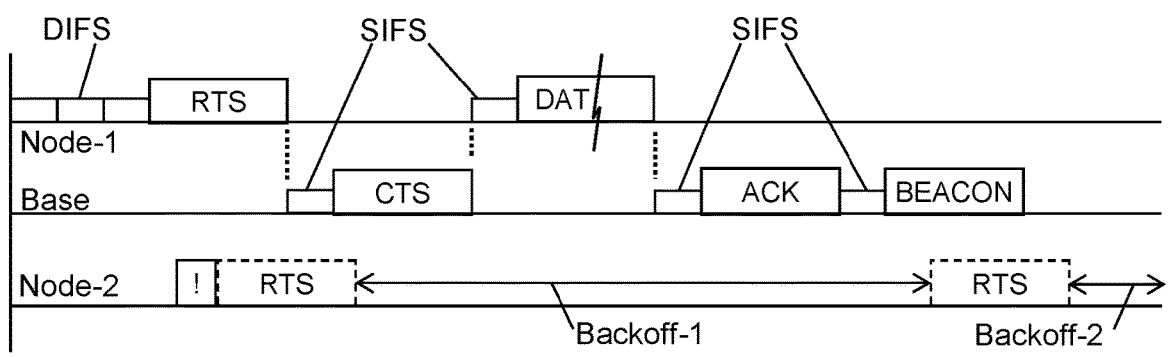
FIG. 2 is a sequence chart showing delayed wireless messages according to prior art.

FIG. 2 is a sequence chart showing a series of wireless messages according to prior art. The actions of a first node (Node-1) are shown as boxes on the first line, the base station (Base) on the second line, and a second node (Node-2) on the third line. Dotted vertical lines indicate synchrony or causation. Interframe spaces such as SIFS, PIFS, and DIFS are shown as one, two, and three small boxes respectively, representing slots or other time divisions. Initially, Node-1 decides to send a message, but is required to listen during a time of one DIFS to detect interfering signals, and then transmits an RTS message to the base station if no interfering signals are present. The base station receives the RTS and, after one SIFS delay, transmits a CTS reply. Node-1 then, after another SIFS delay, transmits its data DAT message. Since DAT messages are typically much longer than the other messages, the DAT is shown truncated as indicated by a jagged line. The base station receives the DAT, and after one SIFS delay, then sends an ACK acknowledgement. Node-1 is done, but in this case, the base station also has a management message (Beacon) to send. After another SIFS, the base station transmits its Beacon message.

In the meantime, Node-2 has encountered a time-critical life-and-death emergency. The emergency event is indicated by an exclamation point. Node-2 is trying to send a help request message to the base station, and is ready to send an RTS message to gain access to the channel as required, but unfortunately Node-1 is already transmitting at that time. Node-2 cannot transmit because its message would cause a collision with Node-1's RTS, rendering both messages unintelligible. The Node-2 RTS is shown dashed since it was not sent. Instead, Node-2 begins a backoff delay (Backoff-1) as required. When Backoff-1 expires, Node-2 again prepares to send its RTS, but this time the Beacon message has taken precedence, and again Node-2 is forced to delay with Backoff-2. In high-density traffic situations, it is common for a node to be forced into backoff multiple times. According to most protocols, each such backoff delay is made longer (twice as long on average) than the previous delay. With such accumulated delays, substantial time may be lost before Node-2 can even begin the process of calling for help. Even worse, in most LANs, a message is dropped entirely after some number of backoff delays, such as ten delays. In that case, the emergency message would not get through at all.

Delays of this magnitude can determine whether someone lives or dies. For example, Node-2 may represent vehicle 104 of FIG. 1. Vehicle 104 is returning home with a doctor and his young family on-board. It is about to crash at high speed into vehicle 105, which is occupied by seven Girl Scouts returning from feeding the homeless. Vehicle 104 includes sensors and processors which sense the collision and is trying to call for help, for example with an automatic collision intervention system. In this example, the collision is unavoidable and there is no time to stop or turn away. However, there is just enough time to send a quick emergency message, thereby requesting immediate medical assistance which will certainly be needed in this scenario. Unfortunately, vehicle 104's attempts to transmit an RTS are repeatedly obstructed, the vehicles collide, the transmitter is demolished, and precious lives are needlessly lost.

Figure 3:
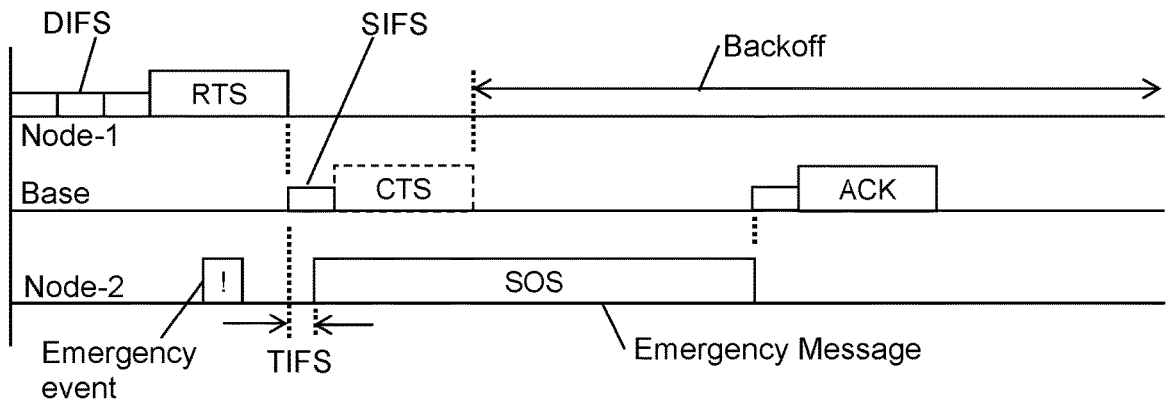
FIG. 3 is a sequence chart showing an exemplary emergency message, according to some embodiments.

FIG. 3 is a sequence chart showing an exemplary emergency message, according to some embodiments. As before, Node-1 first transmits its RTS. An emergency event occurs to Node-2, but Node-2 cannot send a message while the Node-1 RTS is ongoing. Therefore, Node-2 waits until the Node-1 RTS is finished, and then waits an additional brief TIFS space to ensure that the RTS is done and no other interfering signals are present, and then begins transmitting its emergency message (SOS). The TIFS space is shorter than the SIFS space that normally separates the RTS and CTS messages. Hence Node-2 begins transmitting at a time less than one SIFS interval following the end of the RTS message. In this way, Node-2 "barges-in" by beginning to transmit its emergency message after a brief TIFS listening time, before the normal SIFS interval has expired. The brief listening time may thereby allow Node-2 to determine that the channel is clear, that the Node-1 transmission is finished, and no other transmissions or noise are ongoing. The listening time may be a fraction of a SIFS as shown, or a small number of microseconds, or the amount of time represented by transmission of a single bit of data at a particular modulation frequency, or a small number of bits, or one byte or a small number of bytes, or other time interval shorter than a SIFS. Alternatively, Node-2 may begin transmitting the emergency message with zero listening time delay, that is, substantially simultaneously with the end of the RTS message.

After the listening time, Node-2 transmits the SOS emergency message. The SOS message begins during the SIFS interval, before the SIFS has completed, thereby preempting other nodes and the base station, each of which can determine that the channel has become occupied and therefore will not begin another transmission. Accordingly, the base station attempts to detect channel activity during the SIFS period, detects the SOS message, and refrains from starting the CTS message (in dash), since that would result in a message collision. Instead, the base station detects and receives the emergency message. The base station then determines, from the message content, that the message is an emergency message and therefore has priority. The base station then sends an ACK to Node-2 acknowledging receipt of the SOS message. The base station then (or simultaneously) communicates the message (or a summary of the message or data contained in the message) to a first-responder or PSAP station via an Internet connection (not shown) or other communication mode. In addition, if multiple relay systems will be handling the message (as is common), the base station may request that each such system provide exclusive access to the emergency message, and any follow-on emergency communications, until done.

In the mean time, Node-1 waits for an expected CTS confirmation to its RTS, but does not receive the CTS because the base station has detected the emergency message first, and therefore did not send the CTS. Node-1 therefore enters a backoff delay.

As shown, the emergency node does not send an RTS and does not seek approval or permission to proceed. Barging-in includes simply beginning the emergency message transmission as soon as the emergency node has verified that the channel is clear. Accordingly, the base station may be configured to recognize that the barge-in message is an emergency message, and may waive all requirements for authorization and approval and registration, etc. The base station, upon detecting that the message is an emergency message, has only one task, to convey the emergency message to the PSAP.

Optionally, Node-2 may take steps to enhance the detection of the emergency message. For example, Node-2 may transmit the emergency message using higher transmitter power than it uses for non-emergency messages. Additionally, Node-2 may reduce the modulation frequency, thereby providing clearer detection by the base station and by other nodes. Such steps may reduce or eliminate hidden nodes in the LAN relative to the emergency node, so that the other nodes can detect the emergency message and refrain from transmitting.

Optionally, Node-2 may use artificial intelligence to assist in determining whether an event is an emergency and/or what type of emergency and/or what kind of assistance is required. For example, a vehicle may include a processor and a wireless communication capability. The vehicle may be an autonomous vehicle driven by a computer, or a human-driven vehicle with an automatic collision-avoidance system, or other vehicle type with sensors configured to determine when the vehicle is in danger of hitting another vehicle or object. The processor may also be configured to evaluate the severity of the danger by calculating parameters such as the probability that it will occur, the amount of harm likely to occur, and the like. These parameters may be determined based on, for example, the projected relative speed of the vehicles at the time of impact and other factors. However, the sensor data and the emergency conditions typically span an extremely wide range of possibilities, and all sensors include uncertainties as well as error conditions.

The positions and motions of the various vehicles involved represents another enormous array of possibilities, and with a wide range of highway conditions, the variations are essentially infinite. In such massively underdetermined problems, artificial intelligence may be advantageously applied. For example, the processor may be configured to use artificial intelligence, or an algorithm derived by artificial intelligence, to assist in determining whether an emergency has arisen and how severe, how urgent, how many potential victims, etc. The processor may use artificial intelligence, or algorithms derived therefrom, to determine what type of emergency response is needed or appropriate, and transmitting messages indicating information about the emergency and the kind of assistance needed. For example, artificial intelligence programs can explore massive amounts of data, comparing previous emergencies to discern correlations that humans would not detect, and those correlations may lead to useful algorithms for analyzing emergency situations rapidly. In addition, such determinations often involve future predictions, correlation of human response patterns, value judgements, and other underdefined problems that artificial intelligence has shown considerable ability to handle, given sufficient training examples. In addition to saving precious time during the imminent emergency period, decision-making with guidance from artificial intelligence may also avoid false alarms and avoid burdening the PSAP with non-essential messages. In addition, the processor with artificial intelligence may detect an imminent collision or other hazard that a human would not observe, or would not discern in time, such as a pedestrian barely visible in fog or an ice slick in the road ahead. Artificial intelligence, applied to analyze or mitigate an emergency, may thereby save valuable time in initiating efforts to avoid or mitigate the harm while rapidly acquiring emergency assistance when needed.

In the example of FIG. 3, Node-2 successfully transmitted its emergency message by barging-in after a short TIFS interval, less than a SIFS interval, following another node's RTS message. The emergency node thus preempted the base station before the base station could send a CTS message, and thereby was able to transmit the emergency message without interference. The emergency message specified the type of emergency and also included the GPS coordinates of the vehicle 104, enabling first-responders to rush to the scene and immediately apply life-saving assistance to all involved. In this way, the systems and methods disclosed herein may save lives by providing timely communication in emergencies. In addition, in some embodiments, the emergency message and the associated systems and methods may be configured to be compatible with advanced networking technologies such as 5G and future 6G and subsequent future technologies.

Figure 4:
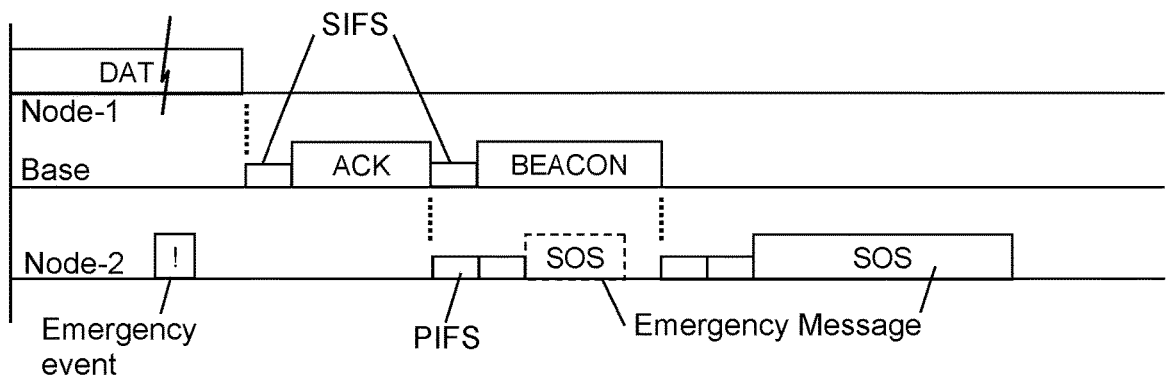
FIG. 4 is a sequence chart showing an exemplary emergency message with a PIFS delay interval, according to some embodiments.

FIG. 4 is a sequence chart showing an exemplary sequence of messages for avoiding a collision, according to some embodiments. Here Node-1 is transmitting a long DAT message while Node-2 experiences an emergency event. To avoid collisions, Node-2 waits for the DAT to finish, and also for the expected ACK message to finish, thereby avoiding colliding with the DAT and the ACK. Node-2 then waits one PIFS after the end of the ACK to ensure that no further messages are forthcoming. However, the base station has been waiting to send a Beacon message, and therefore the base station waits just one SIFS after the ACK and then begins sending the Beacon. Node-2 detects the Beacon during the PIFS listening time, since a PIFS is longer than a SIFS, and therefore withholds the emergency message (in dash) until the Beacon is done. Then, Node-2 waits a PIFS delay again, and finding no further interference, then sends the emergency message SOS.

In some legacy protocols, a node that sends a DAT and fails to receive an ACK may retransmit the DAT. In this example, Node-2 has avoided such an additional delay by waiting until after Node-1 had received the ACK.

In some LANs, depending on the distances between nodes, it may be difficult for one node to detect a transmission from another node, especially if the transmitting node waits for a short delay less than one SIFS before transmitting. In this example, Node-2 has avoided a collision by waiting a PIFS after the ACK and again after the Beacon message, thereby enabling Node-2 to detect the base station transmissions (having only one SIFS delay) while preempting any RTS messages from the other nodes (which must wait a DIFS). The emergency node waited a PIFS delay, which is longer than the SIFS that the base station must wait, and less than the DIFS that the non-emergency nodes must wait. By waiting these short intervals to allow competing traffic to pass, the emergency node has avoided collisions while transmitting the emergency message.

Barging-in, for this example, means transmitting the emergency message after just a PIFS delay, rather than a full DIFS delay, following the triggering events. The triggering events are the end of the ACK and the end of the Beacon messages.

A node wishing to send a non-emergency message is generally obligated to perform a backoff delay if the node discovers an ongoing transmission when the node commits to send. However, as shown, Node-2 did not enter a backoff delay upon detecting that the DAT message was ongoing when the emergency event occurred, nor when the Beacon message preempted the initial attempt at sending the emergency message. Nodes wishing to send emergency messages are exempt from the backoff rule, in some embodiments, and hence the emergency message may be transmitted without delay, other than the short waiting times necessary to avoid collisions as shown.

Figure 5:
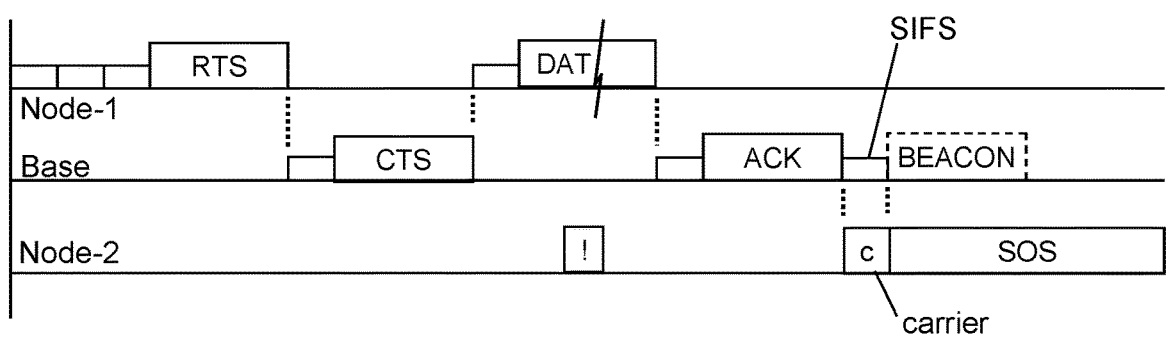
FIG. 5 is a sequence chart showing an exemplary emergency message with a leading carrier-signal interval, according to some embodiments.

FIG. 5 is a sequence chart showing an exemplary barge-in sequence, according to some embodiments. Node-1 sends an RTS, receives a CTS from the base station, and transmits its DAT message. During the DAT message, Node-2 detects an emergency event, but then waits while Node-1 finishes the DAT, and additionally waits while the base sends an ACK, thereby allowing Node-1 to complete its action. Then, Node-2 transmits its emergency message. As mentioned, an advantage of allowing Node-1 to finish may be to avoid a possible collision, since if Node-1 were interrupted and failed to receive an ACK, Node-1 might be inclined to retransmit the DAT immediately, which would then collide with the emergency message. By allowing Node-1 to fully finish, Node-2 has endured a short delay, but has avoided a much more costly delay from colliding messages.

In this example, the triggering event is the end of the ACK message. Responsive to the triggering event, Node-2 begins transmitting immediately, without a TIFS delay (that is, the listening time is zero time or a ZIFS). Node-2 may arrange to begin transmitting substantially simultaneously with the end of the ACK message by monitoring the ACK message in realtime, thereby determining when the ACK will end. For example, Node-2 may determine the ACK modulation frequency and may interpret the ACK contents, and may thereby calculate when the ACK message will end. ACK messages generally follow a specific protocol. Node-2 can thereby determine when to begin transmitting simultaneously or nearly simultaneously with the end of the ACK. An advantage of the emergency node transmitting with nominally zero delay may be that the base station would detect the emergency transmission regardless of speed-of-light delays and the like. Since the base station is required to delay a full SIFS before transmitting, the base station would detect the emergency transmission in time to withhold its own message, thereby avoiding colliding with the emergency message.

In this example, Node-2 initially transmits a period of unmodulated carrier signal "c". The carrier signal may be emitted for one SIFS length as depicted, or another interval. Then, Node-2 begins transmitting the emergency message SOS. An advantage of transmitting an unmodulated carrier signal before the emergency message may be that the base station and the other nodes can readily detect the carrier signal, without having to align their receiver timebases to Node-2. An unmodulated carrier signal is generally a featureless, continuous waveform; hence the timebase is not an issue. By detecting the carrier signal, the base station and the other nodes may thereby determine that the channel is occupied and may withhold their transmissions. To receive and demodulate the rest of the message, however, it is generally necessary to align the receiver timebase with the modulation of the emergency message. Therefore, after the carrier signal interval, the emergency message may include a Preamble and SFD, thereby enabling the other receivers to align their timebases to Node-2 and to properly receive the emergency message.

The duration of unmodulated carrier signal may be one TIFS, or less than one SIFS, or one SIFS, or one PIFS, or one DIFS, or less than one DIFS, or longer than one DIFS, or a time corresponding to the transmission of one or several bits of data or one or several bytes of data or one or several slots at a particular modulation rate, or other value.

The example also shows a Beacon message in dash. The base station was intending to transmit the Beacon message after the ACK plus one SIFS, but in this case the base station detected Node-2's warning carrier signal during that SIFS interval. Therefore, the base station deferred its Beacon message until after Node-2 had been served.

Figure 6:
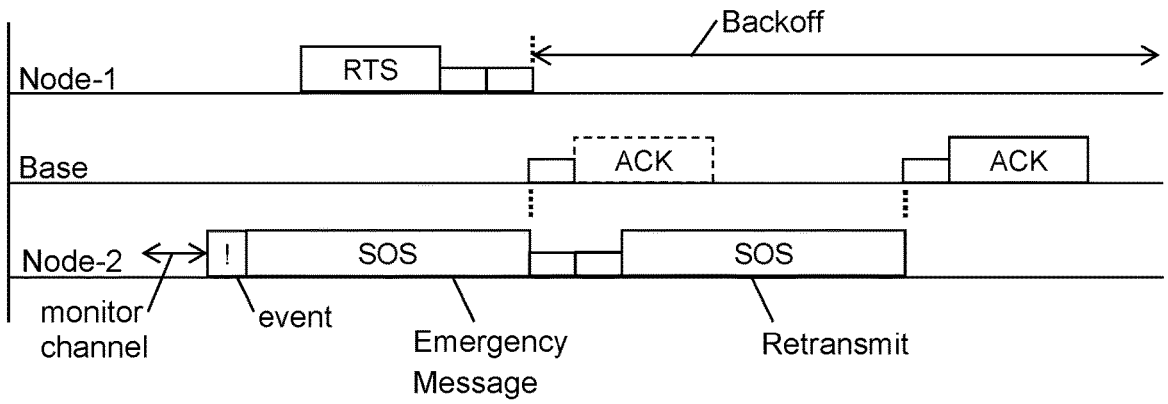
FIG. 6 is a sequence chart showing an exemplary retransmission of an emergency message following a collision, according to some embodiments.

FIG. 6 is a sequence chart showing an exemplary protocol for retransmitting an emergency message after a collision, according to some embodiments. Node-2 is shown initially monitoring the channel prior to the emergency, and detects no activity. Then Node-2 suddenly discovers an emergency event. Since Node-2 has already determined that the channel is clear, Node-2 begins sending the emergency message SOS immediately after the event, without waiting for a TIFS or other delay. Node-2 then waits for an expected ACK acknowledgement from the base station. However, Node-1 transmits an RTS message during the emergency message, causing a message collision. Perhaps they both started at the same slot and therefore did not detect each other. Or perhaps Node-1 is hidden from Node-2, or other malfunction. In any case, the collision renders both messages unintelligible.

Node-2 then attempts to detect the expected ACK. Node-2 waits one SIFS, which is the expected dead space before an ACK reply, and then listens another listening interval, which in this case is another SIFS, attempting to detect the ACK. However, the base station does not send an ACK reply to Node-2 because the emergency message was collided. The base station does nothing. Node-2, failing to receive the ACK within a predetermined interval (two SIFS here), concludes that something went wrong with its transmission, and therefore retransmits the emergency message a second time. The retransmitted message is then received by the base station, and the base station finally sends the ACK as shown.

Normally, for non-emergency communications, a node that sends a message (RTS or DAT) and fails to get a reply (CTS or ACK) is required to begin a backoff delay before transmitting again. However, for an emergency message, such delay requirements may be waived. Accordingly, Node-2 did not perform a backoff delay after failing to receive the ACK upon the first transmission, but rather retransmitted the emergency message immediately after determining that no ACK was forthcoming.

In the meantime, Node-1 is waiting to receive a CTS response to its RTS message, and has no way to know that the RTS was collided. Therefore, Node-1 waits for the usual SIFS space and then listens for an additional interval, which again is modeled here as a second SIFS interval, to detect the expected CTS message. Failing to detect any transmission from the base station during that predetermined time, Node-1 then concludes that its RTS was collided or some other mishap occurred, and therefore Node-1 is obligated to perform a backoff delay. Node-1 remains in backoff while Node-2 retransmits the emergency message.

The retransmission is shown beginning after two SIFS following the end of the first emergency message, one SIFS being the usual dead space and the second SIFS being a listening time to attempt to detect an incoming ACK. Since the two SIFS intervals are less than one DIFS, in this example, Node-2 successfully preempts other nodes waiting to send an RTS. In addition, by retransmitting the emergency message after failing to receive a confirming CTS or ACK message, the emergency node may thereby increase the probability that the emergency message gets through to the base station.

As an option, Node-2 may wait for some time other than two SIFS before retransmitting the emergency message, such as one SIFS plus one TIFS, where TIFS is less than a SIFS but is long enough for Node-2 to verify that no reply is forthcoming. Preferably the total delay for Node-2 is less than one DIFS, since after that time a competing node is permitted to send an RTS message, which would result in further collisions or delays for the emergency node.

The present example, in which an emergency message is retransmitted without performing a backoff delay and without other precautions and delays, is in contrast to the actions of a node having a non-emergency message to send. A non-emergency node that transmits an RTS and fails to receive a CTS reply is obligated to perform a backoff delay before transmitting again, and in addition must monitor the channel for at least one DIFS after a backoff delay, and only then may begin transmitting the RTS. The emergency node may violate these rules because the emergency message has the highest level of priority. In many emergency situations, such delays can have extreme consequences.

Figure 7:
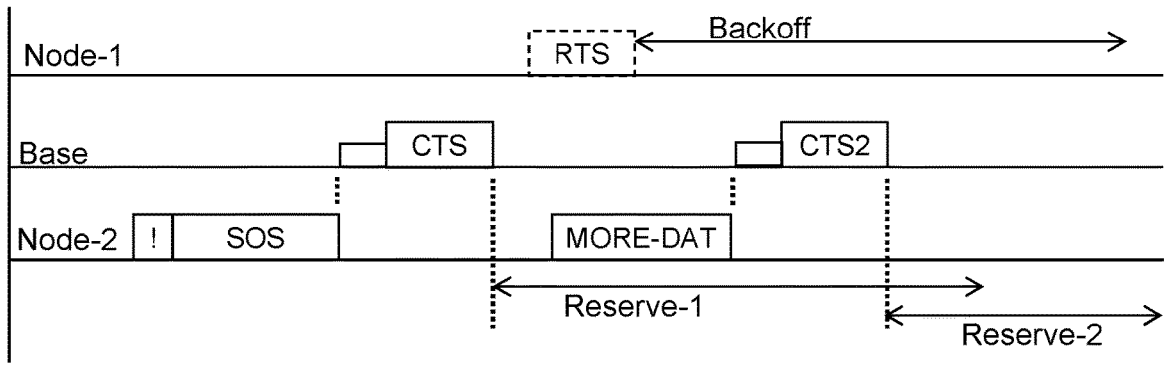
FIG. 7 is a sequence chart showing exemplary emergency messages with Reserve intervals, according to some embodiments.

FIG. 7 is a sequence chart showing an exemplary protocol for a node to send an emergency follow-up message, according to some embodiments. Here Node-2 detects an emergency event and immediately sends an SOS emergency message to a base station. After the emergency message, the base station sends a CTS message that includes a Duration datum set for a maximum time value, thereby generating a contention-free interval (Reserve-1) during which other nodes are obligated to refrain from transmitting. The purpose of the Reserve is to give Node-2 time to send a follow-up message, if needed, without contention from other nodes.

Node-2 then transmits a follow-up message (More-DAT) containing, for example, location data or further details on the type of emergency or a request to open a voice link. While Node-2 is transmitting the More-DAT message, Node-1 decides to send its own RTS message, which is shown in dash because Node-1 detected the CTS message, recognized the Reserve state for the Duration interval, and therefore refrained from sending the RTS. As mentioned, none of the nodes is hidden relative to the base station, and therefore Node-1 can detect the base station's CTS even if Node-1 and Node-2 are hidden from each other. Therefore, Node-1 knows that a Reserve interval has been established, according to the Duration value in the CTS message, and begins a backoff delay.

After the More-DAT message, the base station again transmits a CTS message (CTS2) to Node-2, again reserving the channel for a further interval (Reserve-2), in case the emergency node has more emergency data to send. For example, Node-2 may request to establish a voice connection through the base station to a PSAP, so that a person at Node-2 may speak with a dispatcher or provide clarification of the help required or mention hazards that the first-responders may not be aware of Such Reserve intervals may be continued successively by each successive CTS message in this way, thereby providing unchallenged exclusive access to the communication channel as long as the emergency communications take place.

As a further option, the CTS messages may include a flag or other indicator indicating that the CTS is in response to an emergency message. Nodes detecting the emergency-flagged CTS messages may then respect a maximum-length Reserve state automatically, regardless of the contents of the Duration field. In that case the Duration field may be used for other purposes.

Figure 8:
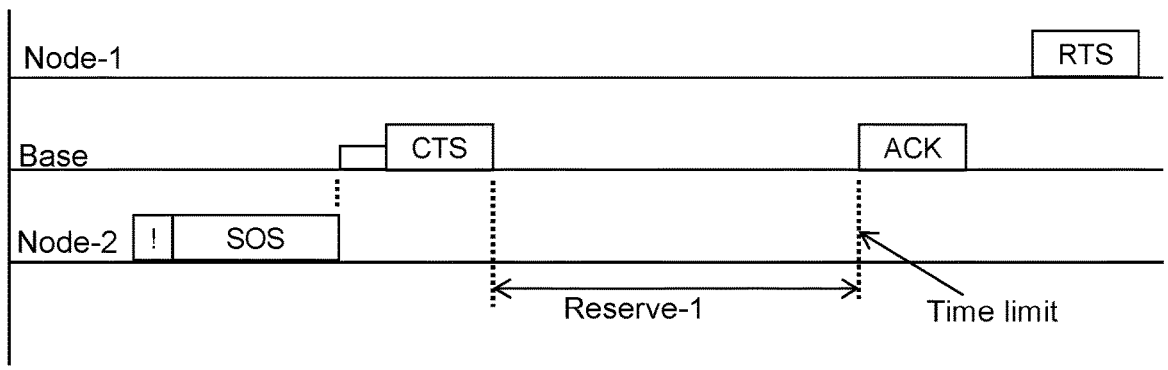
FIG. 8 is a sequence chart showing expiration of an exemplary Reserve interval, according to some embodiments.

FIG. 8 is a sequence chart showing an exemplary emergency message according to some embodiments. Node-2 detects an emergency event and sends an SOS emergency message. The base station sends a CTS message to prompt Node-2 to send further messages if available, and also to reserve an interval (Reserve-1) during which Node-2 will have exclusive use of the channel. However, in this case Node-2 has no further messages to send. Therefore, when the Reserve-1 interval ends (indicated by "Time limit"), with no further activity from the emergency node, the base station concludes that Node-2 is done. The base station therefore sends an ACK message, rather than another CTS, thereby indicating that the emergency state is lifted. The other nodes also receive the ACK message, which thereby releases the contention-free exclusivity period and permits the other nodes to begin sending messages in regular competition with each other. Accordingly, Node-1 sends an RTS message shortly thereafter. The example shows how the contention-free exclusivity or Reserve state, for an emergency node, may be established using a CTS message, without the base station transmitting a separate contention-free declaration message. The example also shows how the contention-free state may be extended as long as needed to protect emergency follow-on messages, by the base station sending successive CTS messages. The example also shows how the Reserve state may be terminated when the emergency node has finished, by the base station sending an ACK, no other message being needed to terminate the contention-free state. As a further option, Node-2 can abort the Reserve-1 period and prompt an ACK reply before the Reserve-1 expires, for example by indicating to the base station that the emergency messages are finished. Node-2 may send a "DONE" message (see below) to the base station, or alternatively if Node-2 is a phone a user can hang up, or may otherwise indicate to the base station that Node-2 no longer needs exclusive control of the channel.

Figure 9:
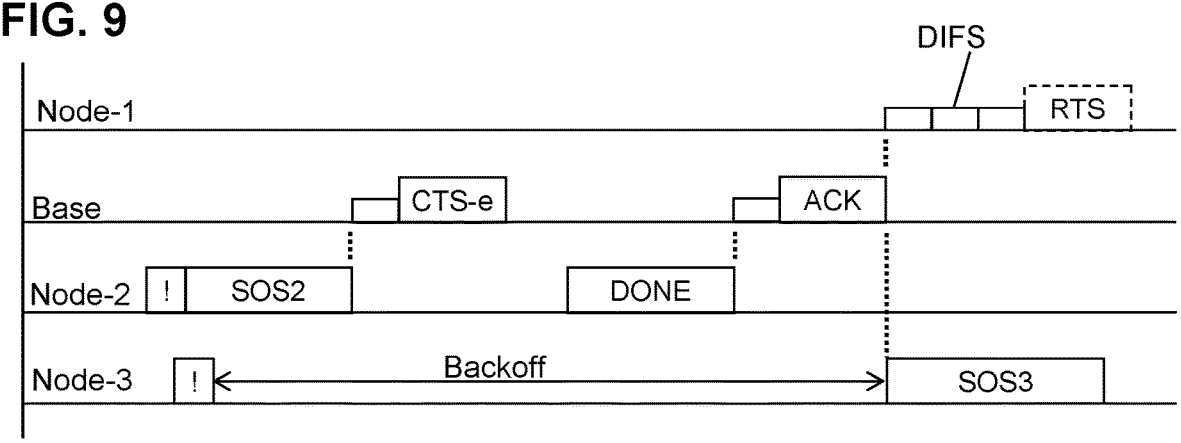
FIG. 9 is a sequence chart showing multiple exemplary emergency nodes avoiding a collision, according to some embodiments.

FIG. 9 is a sequence chart showing an exemplary protocol for multiple competing emergency nodes to avoid colliding, according to some embodiments. In some emergencies, multiple emergency request messages may be transmitted from multiple nodes nearly simultaneously. For example, a multi-vehicle pileup on a freeway, a fast-spreading apartment fire, a tornado striking a populated area, an earthquake with multiple casualties, terrorist events, airplane crashes, and many other emergency events involving multiple victims occurring substantially simultaneously could result in multiple nearly simultaneous emergency messages. Such a message load could cause collisions and/or overwhelm the base station or the PSAP, among other problems. To avoid this, the nodes wishing to send an emergency message may be configured to detect when another emergency message is already in progress, and to perform a backoff delay to avoid interfering with the earlier emergency message. In most mass-casualty or mass-risk events, it is not necessary that all of the emergency messages reach a PSAP because they likely carry essentially the same information. The first emergency message is generally the most crucial because it may specify the nature and location of the emergency, thereby prompting an immediate response, while the numerous later messages may add little or no further information needed by the first-responders. Therefore the first emergency message to be transmitted may be given priority while the subsequent emergency messages may be caused to wait in turn. This is in contrast to an emergency message that avoids colliding with a non-emergency message by waiting until the non-emergency message is done, but not performing a backoff delay before commandeering the channel. Thus an emergency node may dominate non-emergency nodes, but must treat other emergency nodes as equals, according to some embodiments.

In the depicted example, Node-2 detects an emergency event and immediately transmits an emergency message SOS2 (SOS from Node 2). Shortly thereafter, Node-3 detects the same emergency event and is prepared to transmit its emergency message SOS3, however Node-3 detects the in-progress SOS2 message, determines from its content that SOS2 is an emergency message, and therefore performs a backoff delay, while continuing to monitor the channel.

After the SOS2 message ends, the base station waits one SIFS and then transmits an emergency CTS message (CTS-e) to Node-2 prompting Node-2 to transmit any follow-on messages. The CTS-e message includes a flag or other indicator indicating that the CTS is for an emergency message. Other nodes, which may be hidden relative to Node-2, can nevertheless receive the CTS-e and may thereby determine that an emergency communication is underway. The other nodes may therefore wait until the initial emergency communication is finished.

In the depicted example, Node-2 does not have any follow-on messages to send, and therefore transmits a short DONE message to the base station, indicating that Node-2 is finished using the channel. The base station then replies with an ACK, which indicates to other nodes that the channel is now open for contention again. However, Node-3 is still waiting to deliver its SOS3 message. Although in backoff, Node-3 may be configured to receive and interpret the various messages, including the ACK message, and thereby determine that it (Node-3) is then free to send the SOS3 message, which it does without delay in this case. (In contrast, if Node-3 had been waiting to send a non-emergency message, it would be required to allow its backoff period to expire before transmitting rather than terminating the backoff at the end of the ACK.)

In the meantime, Node-1 has been waiting to send its non-emergency RTS message, and has been waiting while the Node-2 sequence finishes. As required, Node-1 waits a DIFS delay before sending its RTS. But now Node-3 has already started sending the SOS3 message, which Node-1 detects, and therefore Node-1 again withholds its RTS (in dash) and starts a new backoff delay. In this way, the various emergency messages may be served sequentially, without overloading the base station and other facilities, while non-emergency messages are held in abeyance.

As a further option, in a mass-casualty event, there may be multiple nodes attempting to send emergency messages nearly simultaneously, and some of them may collide. For example, a Node-4 (not shown) may detect the emergency event and the SOS2 message, enter a backoff state, and then detect the ACK message. Node-4 may, like Node-3, opt to transmit an emergency message immediately upon the end of the ACK, in which case there would be a collision between the emergency messages of Node-3 and Node-4. Those nodes would then fail to receive a confirmatory reply from the base station, and may thereby conclude that multiple emergency messages are interfering with each other. To avoid further collisions between emergency messages, Node-3 and Node-4, plus any other emergency nodes ready to send emergency messages, may enter backoff delays in order to space apart their various transmissions. Although Node-3 and Node-4 would be delayed in this case, it may be satisfactory that the earlier emergency message (SOS2) had already been transmitted, and therefore the first-responders have already been alerted to the emergency. The additional emergency messages may not be necessary for the first-responders to begin an appropriate rescue; hence the delays in the later messages may not be consequential.

In summary, the present example shows that Node-3 wishing to transmit an emergency message is obligated to backoff delay if preempted by an earlier emergency message SOS2, whereas Node-3 would not be required to perform a backoff delay if the interfering message were a non-emergency message. By selectively employing backoff delays to avoid other emergency messages, but not for non-emergency messages, the emergency nodes may avoid colliding with each other even when multiple nodes attempt to send emergency messages nearly simultaneously. In addition, all of the emergency nodes (as well as the non-emergency nodes) may be obligated to respect the Reserve interval of the first emergency message, to avoid colliding. The intent of this protocol is to ensure that the first emergency message is delivered to the PSAP as the top priority so that an appropriate rescue response can be initiated quickly, while the later emergency messages may be delayed and then delivered sequentially, thereby avoiding overloading the network and the PSAP.

Figure 10:
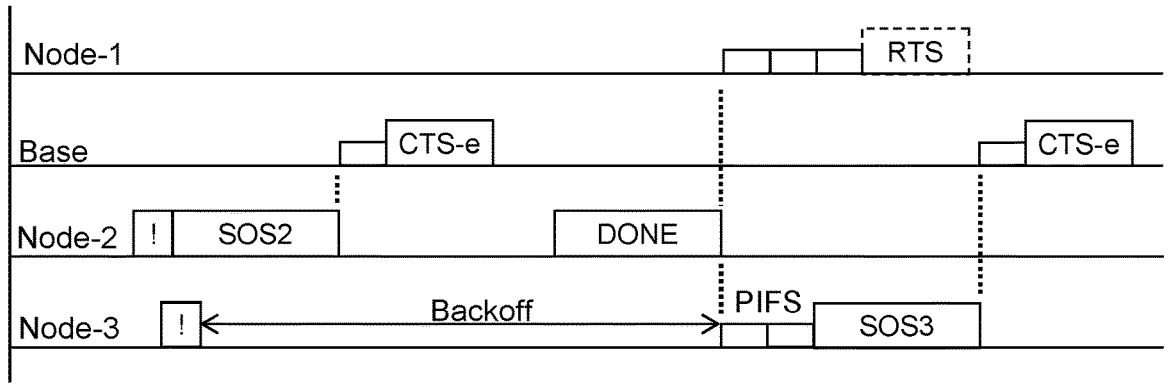
FIG. 10 is a sequence chart showing exemplary emergency nodes, according to some embodiments.

FIG. 10 is a sequence chart showing another exemplary protocol for multiple emergency nodes to avoid collisions, according to some embodiments. Again Node-2 detects an emergency event and transmits an emergency message SOS2, while Node-3 withholds its emergency message to avoid collisions. The base station sends an emergency CTS to Node-2 responsive to SOS2, requesting any follow-on messages that Node-2 may have. Again Node-2 has no follow-on messages, so it sends a DONE message. In this case, however, the base station is not configured to provide an ACK message responsive to the DONE. Instead, the base station merely accepts the DONE message as the conclusion of Node-2's messaging, which ends Node-2's channel dominance. However, Node-3, which is still in backoff delay, listens for the expected ACK following DONE. Node-3 monitors the channel for a full SIFS since that is the usual space between a node message and a base station response, plus an additional amount of time sufficient to determine whether the base station is going to transmit the ACK or other message. In this case the total listening time is shown as a PIFS, but it could be any time greater than a SIFS (to detect any further messages) and preferably less than a DIFS (to avoid letting any non-emergency nodes transmit).

After the PIFS delay, Node-3 has determined that the ACK is not forthcoming, and therefore interprets the DONE message as the conclusion of the emergency Reserve state. Node-3 then transmits its emergency message SOS3. The base station replies with a CTS-e as before. In the meantime, Node-1 waits a DIFS after the DONE message and is again blocked from sending its non-emergency RTS (dash), and therefore does another backoff.

As a further option, Node-3 may perform a backoff delay with a random delay time after being preempted by the earlier emergency message, rather than transmitting promptly after the DONE message. The purpose of performing a backoff at that time may be to avoid collisions with other emergency nodes that have the same intention. Thus each emergency node that is prevented from transmitting by another emergency message may be configured to automatically enter a backoff delay on the assumption that there may be other competing emergency messages with a high risk of starting in the same slot. The backoff delays are intended to avoid this.

By monitoring the channel to receive emergency messages from various nodes, as well as any control-type messages from the base station, each node wishing to transmit an emergency message may avoid collisions by withholding transmitting while an earlier emergency message sequence finishes. The waiting emergency node may determine when the channel is available by detecting an ACK, or a DONE that is not followed by an ACK, and may perform a backoff delay to avoid subsequent collisions. By yielding to the first-transmitting emergency message, the nodes enable first-responders to initiate a response while avoiding message overload even in a mass-casualty event with an otherwise overwhelming number of near-simultaneous emergency calls.

Figure 11:
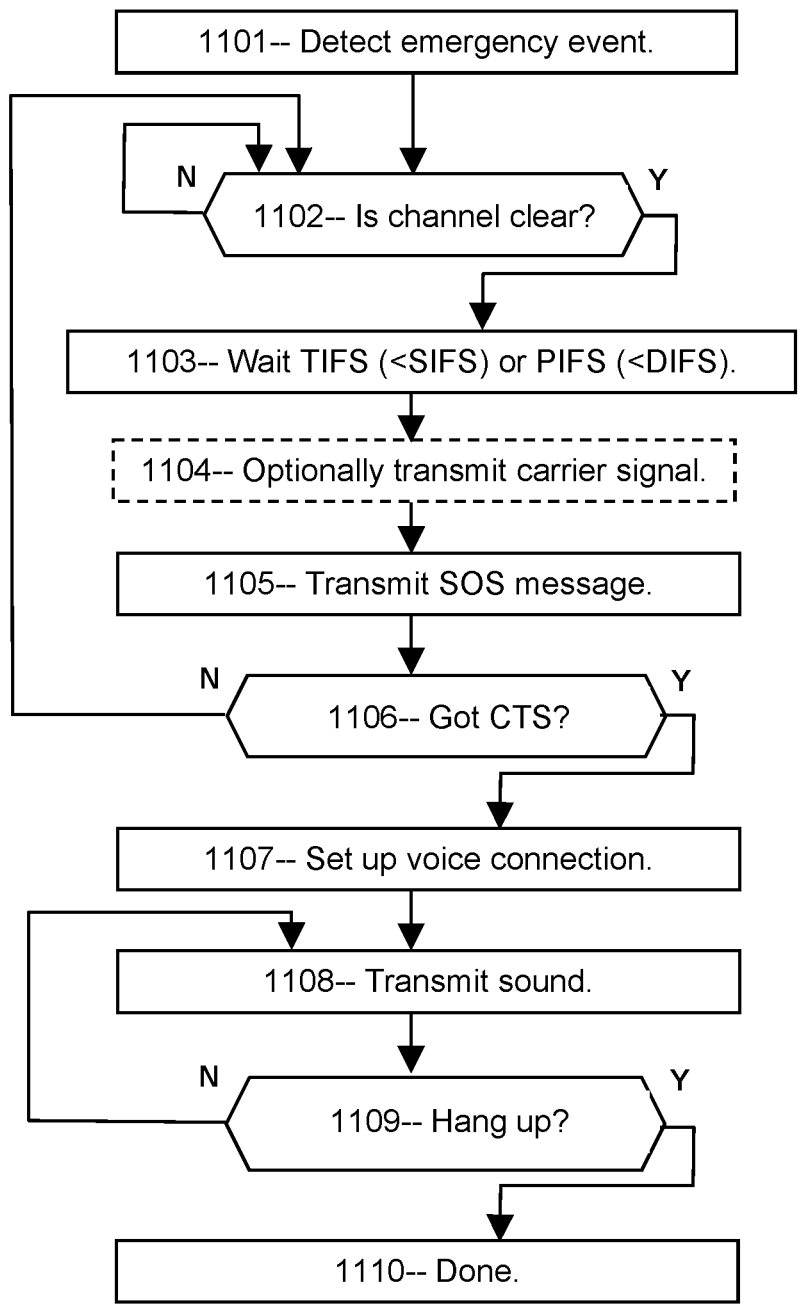
FIG. 11 is a flowchart showing an exemplary method for transmitting one or more emergency messages, according to some embodiments.

FIG. 11 is a flowchart showing an exemplary method for a node to obtain channel exclusivity, send one or more emergency messages, and then terminate the connection. At 1101, the node detects an emergency event, for example an autonomous vehicle detecting an imminent vehicle collision on a highway, or a health sensor detecting a patient in distress, or a building alarm system detecting an intruder. At 1102, the node may check whether the channel is clear by listening for carrier signals or other signals or interference or noise on the wireless channel. If such activity is detected, the node may continue checking until the channel is clear before sending the wireless message. As an alternative, the node may be configured to monitor the channel continuously in advance of detecting an emergency, and may thereby avoid having to check it again after the emergency event, and so may begin transmitting immediately after the emergency event. However, in the present example, the node checks the channel after detecting the emergency event.

At 1103, the node waits for a short listening time, such as a TIFS or a PIFS, after detecting that the interference has ended, and then at 1104 may optionally (in dash) transmit an unmodulated carrier signal for a period of time, such as a TIFS or one slot or one SIFS or a longer interval. At 1105, the node transmits its emergency message SOS to the base station. At 1106, the node attempts to receive a CTS from the base station in reply to the emergency message, thereby indicating that the emergency message was received and that the node is cleared to send additional data, such as a request for a voice connection. If, however, the node fails to receive a CTS at 1106, due to a collision for example, the node may repeat the emergency message transmission after again checking that the channel is clear at 1102. Alternatively (not shown) the node may perform a backoff delay before transmitting, to avoid collisions with other possible emergency messages.

After receiving a CTS message at 1106, the node may then request a voice connection at 1107, or it may send other follow-up data, during a contention-free Reserve interval provided by a Duration datum in the CTS message. After setting up the voice connection, at 1108, the node may transmit sound, such as the voice of a driver or patient or victim, or other sound according to the type of emergency. When done, the node may terminate the session at 1109 by hanging up or sending a particular message to the base station indicating completion, or by remaining silent until the contention-free interval expires at 1110.

Figure 12:
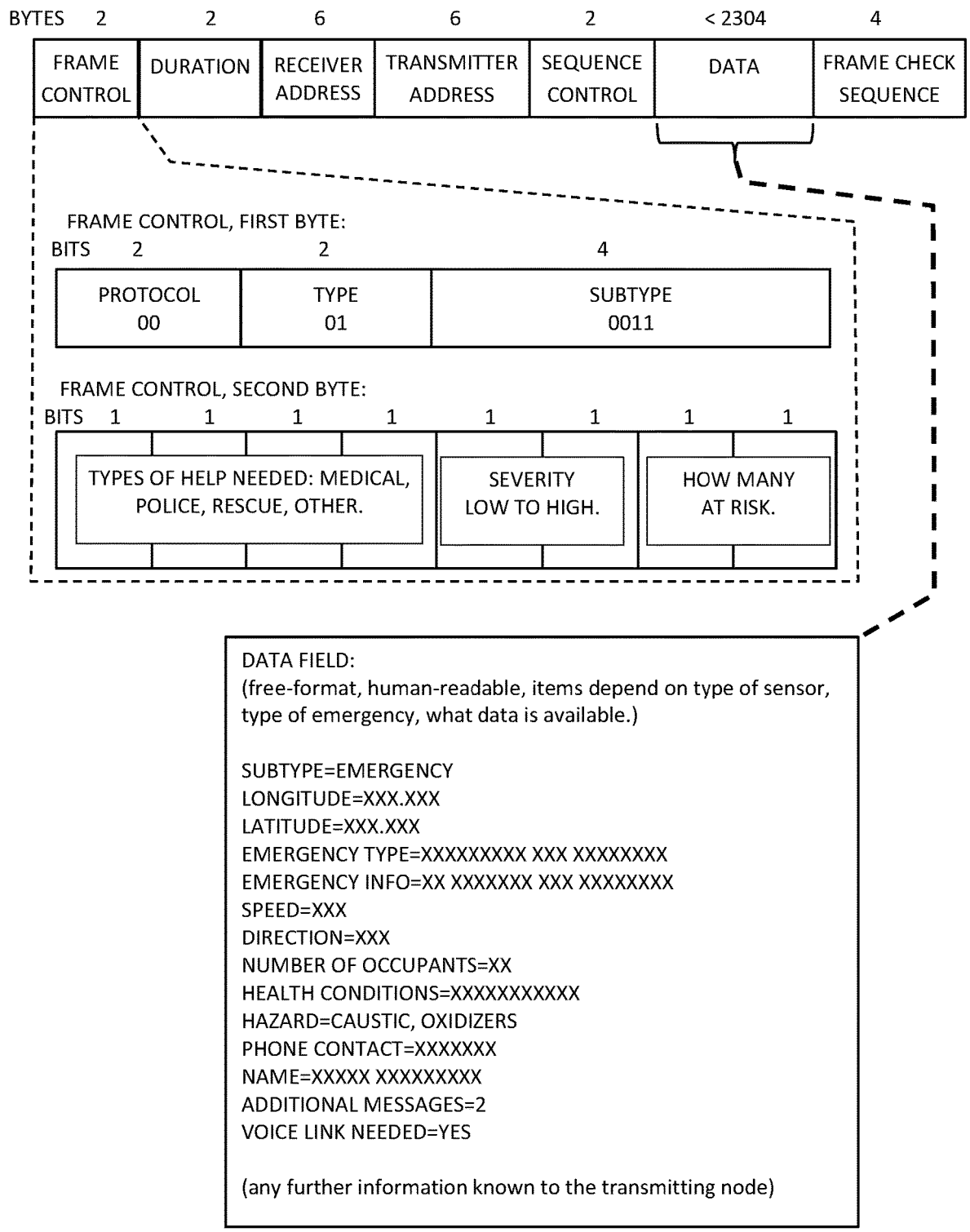
FIG. 12 is a schematic showing an exemplary emergency message, according to some embodiments.

FIG. 12 is a schematic showing exemplary fields of an emergency message, according to some embodiments. In the depicted example, the emergency message includes a Frame Control field, a Duration field, a Receiver Address, a Transmitter Address, a Sequence Control field, a Data field, and a Frame Check Sequence. Not shown is a Preamble and SFD which the transmitter may prepend to the fields shown here. The size of each field in bytes is shown above each field. The Data field is limited to no more than 2304 bytes by convention, although other lengths may be arranged.

Also shown are details of an exemplary Frame Control field including a first byte and a second byte. The first byte includes a Protocol value (2 bits), a Type value (2 bits), and a Subtype value (4 bits). In the example, the Protocol is "00" in binary, indicating compliance with 802.11 versions, the Type value is "01" indicating that the message is a Control-type message, and the Subtype is shown as "0011" (or other code not already allocated) which indicates that the message is an emergency and should be accorded the highest possible priority.

The second Frame Control byte conventionally consists of eight single-bit flags, but they are expected to be not applicable to an emergency message. Instead, the byte may be reprogrammed to contain information. The second Frame Control byte may be used, for example, to convey terse information about the emergency, in some embodiments. The example shows a 4-bit region that indicates the type of emergency or type of help needed, a 2-bit region indicating the level of severity or urgency, and a 2-bit region indicating a number of people at risk or other measure of the problem magnitude. For example, the first four bits may be set individually, thereby indicating which type or types of response are needed, such as bit 1 for Medical assistance, bit 2 for Police assistance, bit 3 for Rescue assistance, and bit 4 for Other assistance, to consider one possible arrangement. The Rescue type may apply to any emergency requiring victim extraction, such as a fire or flood or earthquake or tornado emergency, or to someone lost in a woods or trapped in a collapsed building, or to someone falling off a boat or pier, or other emergency requiring victim extraction or victim rescue. Multiple bits may be set, depending on the situation, such as a person who was shot may request both Medical and Police assistance.

The Severity region may indicate the magnitude of the risk subjectively, such as binary "01" being a low or manageable risk but still requiring assistance, "10" representing a higher or more urgent risk, and "11" being the highest emergency level. A Severity of "00" may be reserved for future use. Alternatively, the four values could represent low, medium, high, and very high severity, or other representation established by convention. As a further option, the four Severity values may represent different levels of potential consequence of the emergency, such as "00" representing low risk of injury, "01" for likely injury risk, "10" for major injury risk such as loss of limb or vision, and "11" for likely fatality risk.

The last region of the second byte of the Frame Control field in the example indicates how many victims or potential victims are involved, wherein "00" represents zero human victims (that is, only animals or property damage are at risk), "01" indicates a solo victim involved, "10" indicates multiple victims expected, and "11" may indicate a large number of potential victims, or may be reserved for future use. By these means, the exemplary emergency message can include sufficient information to enable first-responders to rush to the scene of the emergency and provide assistance appropriate to the type of emergency, even if no follow-on emergency messages are able to be sent, and even if no voice link is able to be established.

The figure also shows a Duration field. However, it may not be necessary to indicate a Duration value if the nodes and the base station are configured to automatically accord a maximum-length Reserve state for each emergency message, so as to avoid collisions. In that case, the Duration field may be repurposed to indicate information about the emergency or the response needed. For example, the Duration field of two bytes may be repurposed to provide the type of terse information discussed above, such as the response type, severity, and number at risk, but with greater range and versatility due to the additional bits available. In that case, the 1-bit flags of the Frame Control field may be used to indicate other relevant information, such as indicating whether additional follow-on data messages are available, whether a voice link is desired, whether the current message is a continuation of a previous emergency message, whether the emergency site includes special hazards that the first responders may need to be aware of, and the like.

As a further alternative, the figure shows a Sequence Control field of two bytes. Typically, the Sequence Control field is not used in Control-type messages such as emergency messages, and therefore may be repurposed to indicate further emergency information about the emergency. In summary, each bit of the emergency message that is not in support of the emergency response may be repurposed for use in conveying encoded information helpful to the base station and/or the PSAP in providing rapid assistance.

Also shown in the figure is an exemplary version of the Data field. The Data field of the message may include more detailed and specific information about the emergency and the assistance desired than can be included in the terse codes of the other fields described above. In the depicted example, the Data field is shown as a free-format, human-readable list of items, such as ASCII-encoded text which is human-readable after being demodulated, decoded, and converted to alphanumeric symbols. For example, each item may include an item keyword followed by the item value or description. The Data field can include an assertion that the message is indeed an emergency message, as well as a repetition of the terse codes described above regarding the Frame Check field. The figure also shows the latitude and longitude of the node, the type and subtype of the emergency, and other items as they are known to the transmitting processor. If the emergency involves a vehicle, its speed and direction may be included. A number of occupants or number of people at risk may be included, plus any health conditions of those people at risk. The Data field may include warnings to the first responders such as chemical hazards as shown, explosive or radiation hazards if present, and the like. First-responders may determine from the initial emergency message that they should bring special gear to manage such hazards. The message may include a phone number such as a mobile phone of one or more of the people involved. One or more names of people involved may also be provided if known. Some of these items may be gleaned from seatbelt monitors, mobile phones on-board, or other sensors, while other items may have been pre-installed by the owner or factory-installed such as vehicle number. Such information may be provided in the emergency message, to guide the PSAP in sending the appropriate kind of help to the right location. The intent of the emergency message in this example is to provide sufficient information to first-responders, in the initial emergency message, so that they will be able to take effective action even if a follow-on message cannot be sent. In addition, the Data field can include instructions to the base station, such as indicating the number of follow-on messages to be sent (thereby requesting CTS messages accordingly), whether a voice link will be needed, and the like.

Figure 13:
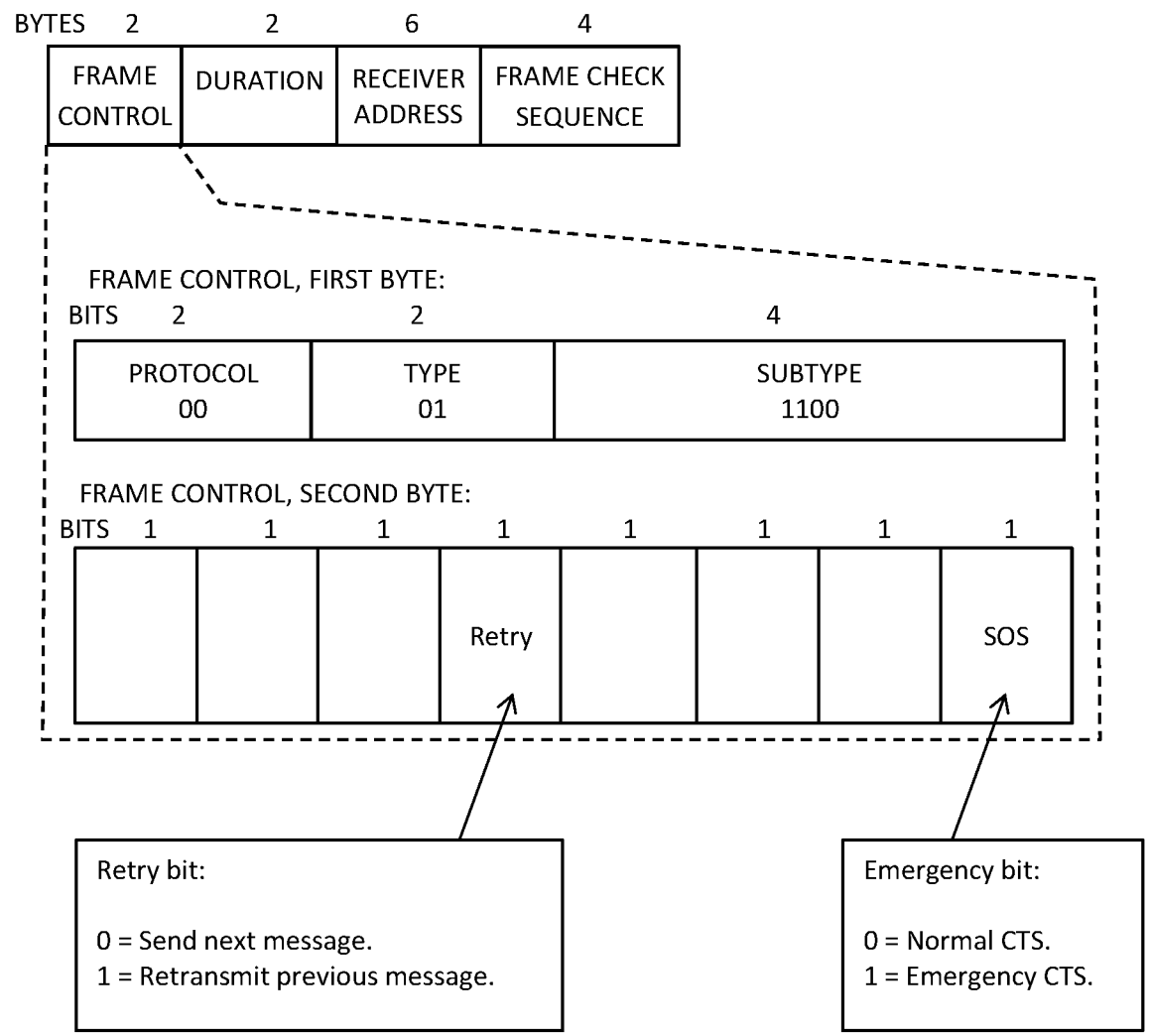
FIG. 13 is a schematic showing an exemplary CTS message, according to some embodiments.

Skilled artisans will know that other bits of the Frame Control flags, other than those indicated in the figure, may be used instead of those depicted. Artisans also know that other fields of the emergency message may be repurposed to convey such information, or that an additional field may be added to the emergency message for this purpose, among other possibilities that artisans may contrive without departing from the scope of the present disclosure FIG. 13 is a schematic showing an exemplary emergency CTS, or CTS-e message, according to some embodiments. The figure shows four fields: Frame Control, Duration, Receiver Address, and Frame Check Sequence. The Frame Control field includes two bytes, of which the first byte includes the Protocol (00), Type (01 for Control), and Subtype (1100 for CTS). The second byte includes eight 1-bit flags which generally are not used in a CTS command. Some of the flags may be repurposed to provide control over the emergency message sequence. For example, the figure shows a particular bit, called the "Retry" bit, which in this case is used to instruct the emergency node to either retransmit the previous message (in case of interference for example) or to proceed with the next available message or fragment. For example, the Retry bit may be set "1" to indicate that the node should retransmit the previous emergency message. A CTS message with the Retry bit set to "0" may be used to instruct the node to send the next message in its sequence, such as a next fragment or an emergency follow-on message.

In addition, the example shows another bit, normally called the "Order" bit, which in prior art CTS messages is generally zero. In the example, the Order bit is reconfigured as an Emergency bit, set to zero for normal messages and to one for an emergency CTS or CTS-e. The various nodes, receiving the CTS message with the Emergency bit set, can thereby determine that an emergency communication is in progress and can therefore remain silent for a maximum-length CTS-Reserve interval, or alternatively until receiving an ACK message from the base station. A node that is hidden relative to the emergency node may fail to detect the emergency message, but all the nodes can receive messages from the base station, and can thereby determine from the emergency CTS message that the emergency condition is in progress and a Reserve has started.

Skilled artisans will know that other bits of the Frame Control flags, other than those indicated in the figure, may be used instead of those depicted, to indicate the Retransmit instruction and the Emergency warning. Artisans also know that other fields of the CTS message may be repurposed to convey such information, or that an additional field may be added to the emergency CTS message for this purpose, among other possibilities that artisans may contrive without departing from the scope of the present disclosure.

Figure 14:
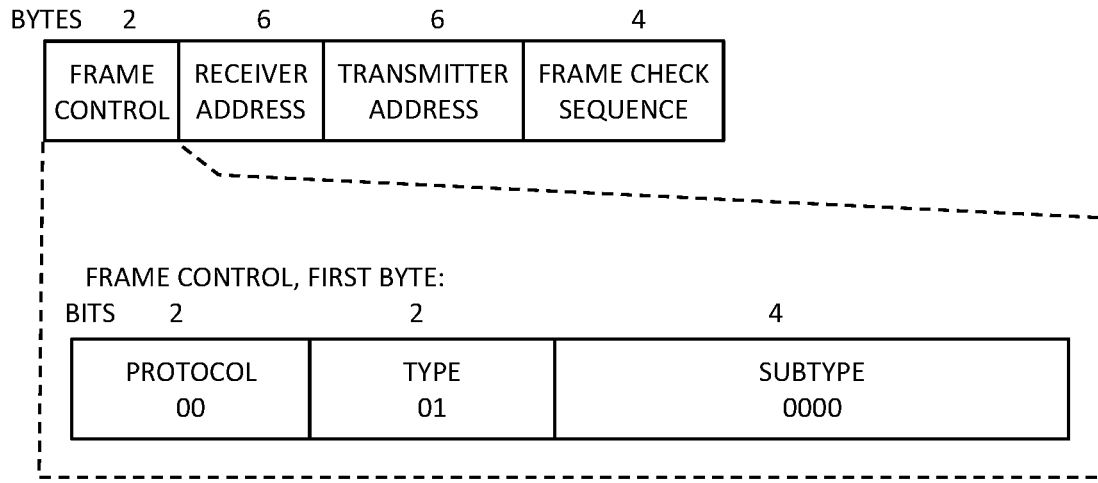
FIG. 14 is a schematic showing an exemplary RETRANSMIT message, according to some embodiments.

FIG. 14 is a schematic showing an exemplary "RETRANSMIT" message, according to some embodiments. As depicted, a RETRANSMIT message may be a short message that a base station can send to a node to indicate that an immediately preceding message transmitted by the node was collided or otherwise not received in a usable form by the base station, and that the node is instructed to retransmit the message. Thus the RETRANSMIT message may serve a similar function to the CTS-e message with a retransmit bit set, as discussed above. The RETRANSMIT message as depicted includes a Frame Control field that indicates that the message is 802.11-compliant (Protocol "00"), a Control-type message ("01"), and a RETRANSMIT subtype message ("0000" or other preferably unassigned subtype code). Emergency nodes receiving a RETRANSMIT message are instructed to retransmit the immediately preceding message, and the other nodes may be informed thereby that an emergency condition is continuing and that a Reserve state at the maximum duration is also continuing. An advantage of the RETRANSMIT message may be that it includes the transmitter address, which is generally the base station MAC address or BSID address. For example, in a crowded area with multiple overlapping LANs, nodes receiving the RETRANSMIT message may thereby determine which LAN is handling the emergency.

Figure 15:
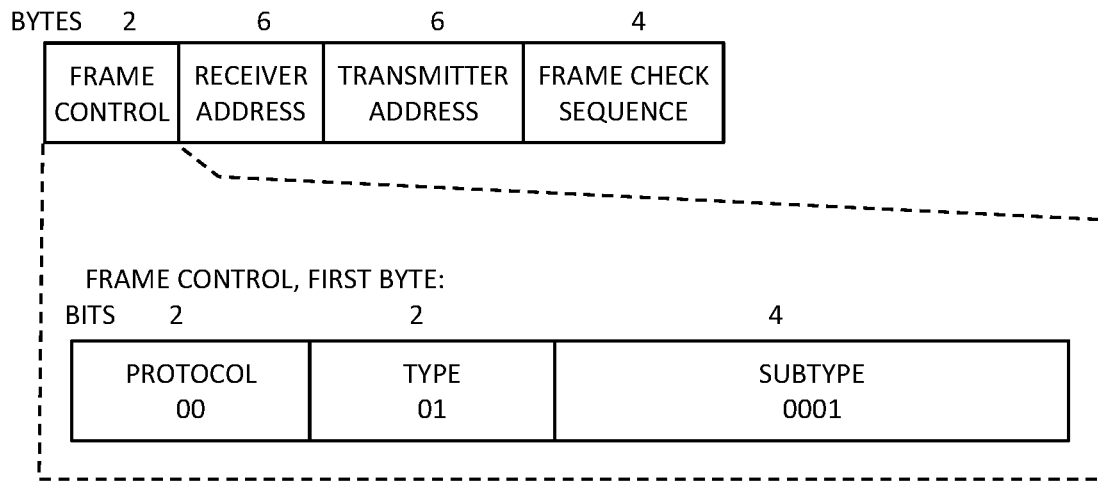
FIG. 15 is a schematic showing an exemplary DONE message, according to some embodiments.

FIG. 15 is a schematic showing an exemplary "DONE" message, according to some embodiments. As depicted, a DONE message may be a short message that a node can send to the base station to indicate that the node has no further emergency messages or fragments to send, and therefore the LAN may return to normal contention-based activity or whatever mode was operational before the emergency. The DONE message as depicted includes a Frame Control field that indicates that the message is 802.11-compliant (Protocol "00"), a Control-type message ("01"), and a DONE subtype message ("0001" or other preferably unassigned subtype code).

Alternatively, the DONE message may be a message according to the example of FIG. 12, but with the second byte of the Frame Control field set to all zeroes, or with the Duration field set to zero, or with a predefined pattern in the Sequence Control field, or with a Data field containing only the word "DONE", or other pattern that indicates that the node is finished transmitting.

The base station may transmit an ACK in response to the DONE message. Nodes that are hidden relative to the emergency node may fail to detect the DONE message and thus may not be informed that the emergency status has been lifted. Therefore, the base station, by transmitting a final ACK after the DONE message, can inform the nodes that the emergency conditions are lifted and that the LAN can return to normal operations.

Figure 16:
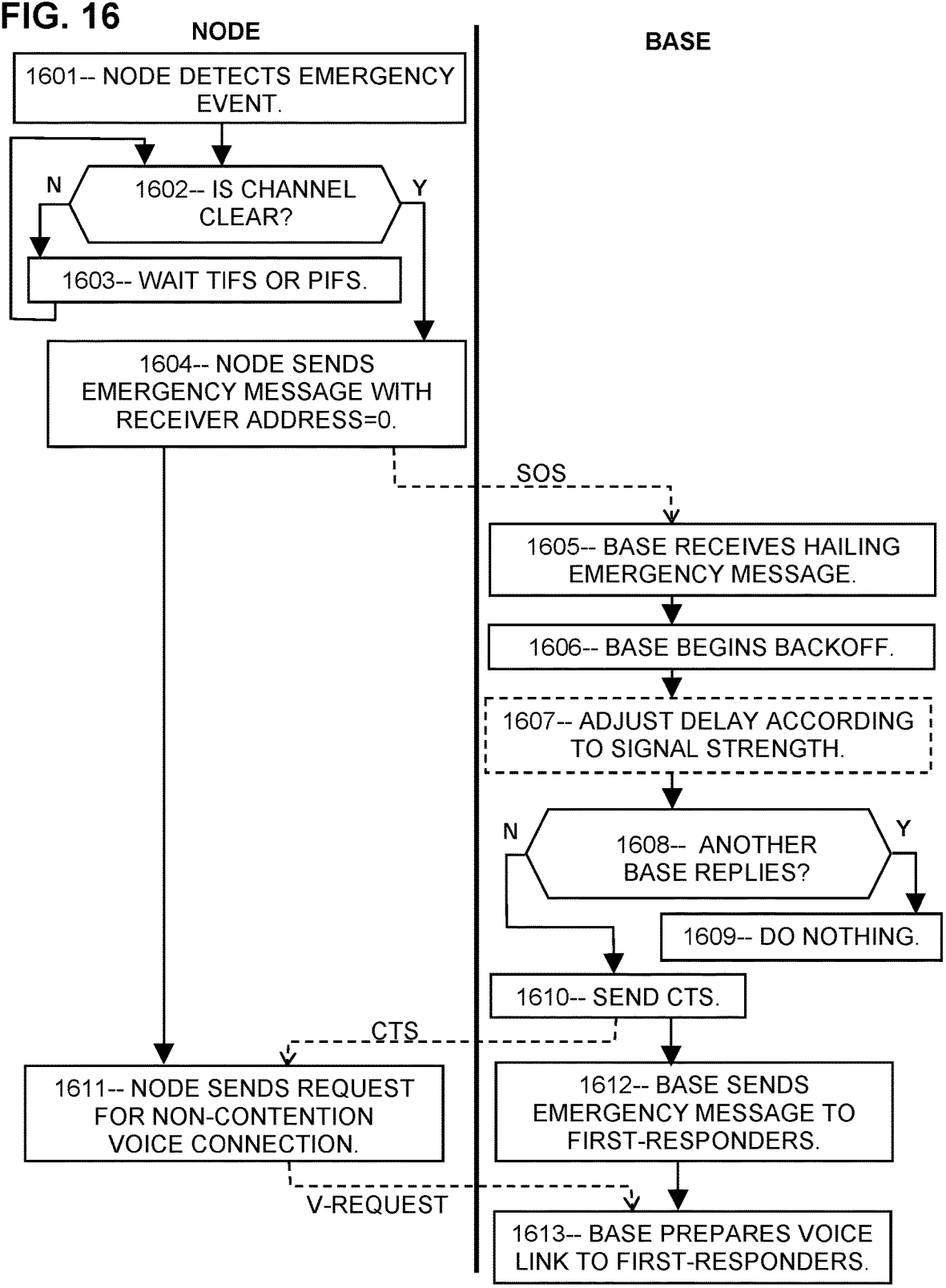
FIG. 16 is a flowchart showing an exemplary method for a node and a base station to respond to an emergency, according to some embodiments.

FIG. 16 is a flowchart showing an exemplary method for a node and a base station to process an emergency message, according to some embodiments. In this chart, the actions of the node are shown at left and the actions of the base station (Base) are shown at the right side, and messages going between the two sides are shown in dash and labeled. The logical progression of steps by the node may be followed by the solid arrows on the left side, while the progression of the base station is given by the solid arrows on the right.

Initially, the node detects an emergency event at 1601, such as a medical sensor detecting a patient's cardiac arrest, a sensor in a vehicle detecting an imminent vehicle collision, or a homeowner hearing a burglar and calling 911, for example. The node then checks whether a communication channel is clear at 1602. If the channel is not clear, the system may wait 1603 for a predetermined time, such as one TIFS or other interval, and check again for a clear channel. When the channel is clear, at 1604, the node may send an emergency message shown as a dashed arrow labeled SOS. By checking the channel for activity with a short period such as one TIFS, the node may detect a clear channel in less time than one SIFS and thereby preempt the base station from transmitting. Alternatively, the node may monitor the channel for a longer time than a SIFS, but less than one DIFS, such as monitoring for a PIFS, and may thereby allow the base station to proceed if the base station has something to send, while continuing to preempt all the other nodes in the LAN which must wait a full DIFS before sending.

If the node is already registered in a LAN, or if the node already knows the MAC address of a base station of a LAN that is within range, then the node may send the message specifically to that base station by including the MAC address of the base station in the Receiver Address field of the message. In the depicted example, however, the node does not know any base station MAC addresses within range, and therefore the node sends the emergency message with a Receiver Address of zero (or other predetermined value) that indicates that the message is a "hailing" type message seeking help from any base station that can detect the message.

At 1605 the base station receives the emergency message and determines that the Receiver Address is zero, indicating that the node does not know which base stations are within range. A danger at that point is that multiple base stations may receive the emergency message and may respond at the same time, causing a collision among the base station responses. To avoid such a message overlap, each base station receiving the emergency message may perform a backoff delay. Base stations do not typically perform backoff delays; only nodes do. However, in the particular case of a hailing-type emergency message, the base stations may use the backoff technique to avoid a collision. Thus at 1606 the base station begins a backoff delay using a randomly-selected delay value, and then responds to the emergency message if no other base station has responded by that time. As a further option (1607, in dash), the base station may select the size of the backoff delay range (which is called a contention window when implemented by a node) according to the amplitude of the signal received from the node. For example, a base station that receives a strong, clear signal may conclude that the node is relatively nearby, and may therefore use a shorter delay range, whereas another base station that receives only a weak signal may use a longer delay range. An advantage of doing so may be that a base station that has the best reception is most likely to win the contention and serve the emergency node, while another base station that has weak reception is likely to delay longer and allow the closer base station to prevail. If there is only one base station within range, then after the backoff delay, that one base station may respond to the emergency message, even if the signal is weak. To guide the choice of delay range, each base station may include a predetermined formula relating the appropriate delay range to the received signal quality. Alternatively, in one embodiment, a base station may include, in non-transient memory, a table or array including a plurality of contention window length values corresponding to various signal strength values. Upon receiving a hailing-type emergency message, a base station may determine the signal strength according to the amplitude of the signal received for example, and may compare that signal strength value to values in the table or array, and thereby determine a contention window value corresponding to that signal strength, and may then use the contention window so determined in selecting a backoff delay.

After the backoff delay, the base station may check at 1608 whether another base station has replied to the node. If another base station has already responded, the base station shown in the chart may remain silent at 1609, thereby avoiding interfering with the emergency communications. If, however, the base station determines that no other base station has responded, then at 1610 the base station sends a CTS message to the node as shown. In addition, or simultaneously, the base station at 1612 sends the emergency message to a PSAP station or other appropriate authority, preferably using a wired connection or some type of communication means other than the wireless channel occupied by the emergency node, although the same channel may be used to contact the PSAP if no other communication means is available. The base station thereby ensures that the first-responders receive the SOS message, including the location and type codes and the like, so that the first-responders can begin taking action even if no further communication from the node is possible.

At 1611, the node transmits a second message to the base station, such as a request to set up a voice connection, or additional data messages as needed. In the example, the node requests a voice connection so that a human at the emergency scene can talk to the first-responders or their dispatcher. That request, labeled V-Request, is then received at the base station at 1613, which proceeds to set up the voice connection from the node through to the PSAP station.

As an alternative way of determining which base station shall respond to the hailing-type emergency message, the emergency message may include location data, and the various base stations that receive the emergency message may compare the emergency location with predetermined location data for each of the base stations nearby. Each of the receiving base stations may then determine, from the location data, which base station is closest to the emergency. The closest base station may then respond promptly, while the other base stations may enter a backoff delay. Each delayed base station, upon expiration of its backoff delay, may determine whether the closest base station or some other base station has responded. If so, the remaining base stations may disregard the emergency message; and if not, they may respond to the emergency message at that time. In addition, the various base stations may select contention window sizes according to their distance from the emergency node, the farthest base station having the longest contention window for example, thereby providing that the closest base station may handle the emergency. In either case, the various non-responding base stations may avoid transmitting on the particular channel occupied by the emergency message for a period of time, or until detecting an ACK from the responding base station, for example.

FIG. 17 is a schematic showing an exemplary emergency message and interference, according to some embodiments.

The emergency message on the Node line includes a Frame Check field (FC), a Duration field (D), a Receiver Address (RA), a Transmitter Address (TA), a Data field with exemplary data items including Latitude (LAT), Longitude (LON), Speed, Direction, Phone, and Name items, and a Frame Check Sequence (CS) field. The second line (Int.) shows three possible interference signals, Interference-1, Interference-2, and Interference-3. Typically, interference garbles only that portion of a message which overlaps the interference, and leaves the remainder of the message unchanged. In most protocols, the receiving processor may be configured to discard a message if the Frame Check Sequence does not agree with the as-received bit code such as a CDC code. However, for an emergency message, the base station may be configured to recognize from the Frame Control portion that the message is a top priority emergency message, and must be handled even if the message is partially corrupted. The base station may send a retransmission message such as a CTS with a retransmit bit set, to cause the node to retransmit the emergency message. However, for various reasons, the node may not be able to retransmit. In that case, the base station may be configured to extract whatever information is available from the emergency message.

In the figure, Interference-1 is shown colliding with certain items in the Data field, but leaves untouched the Frame Control, Transmitter Address, and Latitude-Longitude portions of the Data field. In that case, the base station may determine, from the Frame Control field, that the message is an emergency message, and also (based on codes in the second byte of the Frame Control) what type of emergency response is needed, a severity level of the emergency, and a number of victims involved. In addition, the location of the emergency node may be obtained from the Latitude and Longitude section of the Data field. In this case, the decodable information in the message may be sufficient for first-responders to begin an immediate rescue. The base station may send, to a PSAP station, a message indicating the type of response needed, the severity, the number of victims, and/or the location of the emergency, among other information. Alternatively, or in addition, the base station may send the raw emergency message (preferably demodulated and decoded) to the first-responder station, if that station is equipped to interpret the raw message data, including determining which parts of the message are uncorrupted.

A second possible collision is shown with Interference-2, which obliterates the location data as well as the Frame Check Sequence. Loss of the Frame Check Sequence probably has no effect since the corrupted message violates it anyway. However, loss of the location data may make it hard for first-responders to reach the emergency site. The Transmitter Address portion of the message is still intact in this example, and that may enable the base station to determine the location of the emergency node. For example, the base station may keep, in non-transient memory, a table or the like correlating the physical location of each node in association with its MAC address. The base station may then include that location information along with the emergency data that the base station sends to the PSAP, thereby enabling the dispatcher to locate the emergency site.

A third possible collision is shown with Interference-3, which is much more damaging, obliterating the entire message except for the Frame Control and Duration fields. Since emergency messages generally demand exclusive use of the channel for a maximum time, the Duration value may not be relevant to an emergency message and therefore the field may be available for other use, such as an encoded identification of each node in the array. The two Duration field bytes may therefore be used to identify the node, for example using an abbreviated two-byte code which can accommodate up to 256 nodes. Code values may be pre-assigned to each node by the base station, for example when each node joins the LAN. The node may be configured to place the identifying code in the Duration field, and the base station may be configured to determine from the identifying code which node has sent the emergency message, and thereby determine the location of that node.

The example shows that an emergency message such as that depicted can provide sufficient information to first-responders to enable a rapid response, even if the message is largely disrupted, as long as the Frame Check and repurposed Duration fields are intact, or the Transmitter Address is legible, or the Latitude-Longitude portion of the Data field is decodable. If the Duration field is lost as well, the base station may inform the first-responder station of the nature of the emergency based on the Frame Control data, plus the location of the base station. The first responders may be able to locate the emergency starting from the base station and following other clues such as a column of smoke for example.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

Embodiments of the systems and methods disclosed herein can provide numerous advantages not obtainable from prior-art wireless protocols. Embodiments may be configured to preempt other nodes and sieze the communication channel by beginning an emergency message transmission in a non-standard way, such as by barging-in after a previous message has ended. For example, embodiments may begin transmitting the emergency message after a short interval, such as a TIFS (which is shorter than a SIFS), or alternatively with zero delay, after a triggering event. The triggering event may be the end of a prior message or of interference, or it may be the emergency event itself. Other embodiments may include waiting a PIFS, or other interval intermediate between a SIFS and a DIFS, after the triggering event and then transmitting the emergency message if the base station has not begun transmitting at that time. Embodiments may be configured to transmit a period of unmodulated carrier signal before the emergency message, to alert the base station and other nodes that an emergency message is forthcoming. The base station and nodes of the LAN may be configured to interpret the unmodulated carrier transmission as a request to refrain from transmitting while the emergency message is in progress. Embodiments may include nodes configured to monitor the channel in advance of an emergency event, so that the emergency message can be started immediately after the emergency event if the channel is known to be clear immediately before the emergency event. Embodiments may include a base station configured to transmit a CTS after receiving the emergency message, thereby prompting the emergency node to transmit further emergency data. Embodiments may include an emergency CTS message that includes an indication that an emergency communication is in progress, and nodes may be configured to refrain from transmitting for an interval thereafter. Base stations may be configured to detect a collided emergency message, to recognize that the collided message is an emergency message, and to send, to the emergency node, a retransmit command in response to detecting the collided emergency message. Embodiments may include a base station configured to transmit an ACK message after the emergency node has finished sending the emergency message or messages, or when the emergency node sends a message indicating that the node has completed emergency communication, or when the emergency node refrains from transmitting for an interval such as a Reserve interval, for example. Embodiments may include an emergency message containing a code that indicates that the message is an emergency message, such as a particular Type-Subtype combination indicating so. In addition, the emergency message may include encoded information indicating, for example, one or more types of emergency response that is needed, and/or a risk or severity level of the emergency and/or a number of victims or potential victims involved. Embodiments may include an emergency message containing a Data field or the like, which may include further information about the emergency such as, for example, the location of the emergency node, further description of the emergency and its circumstances, contact numbers and the like, and so forth. Embodiments may include a Duration field and/or a Sequence Control field and/or other fields configured to contain information about the emergency and/or a response desired. Embodiments may include artificial intelligence or algorithms derived therefrom, configured to perform emergency services such as recognizing emergency situations based at least in part on sensor data and/or evaluating which types of emergency response may be needed and/or providing further guidance to first responders, for example. Embodiments may include a node configured to transmit an emergency message with a Receiver Address field of zero, indicating that the node does not know the identity or address of base stations within range. Base stations receiving an emergency message with zero Receiver Address may be configured to respond to the emergency message, and may perform a random backoff delay before responding. In addition, the backoff delay range or contention window may be determined at least in part by the signal quality of the emergency message received by the base station, or the distance of the emergency node from each base station, or other criterion for selecting one of the base stations over the others. Thus the embodiments may provide emergency communication with minimal delays, even in high traffic density conditions and even if the node does not know which base stations are in range. Embodiments may further provide sufficient information for first responders to begin appropriate action based on the initial emergency message alone. Nodes may be configured to withhold transmission upon detecting an emergency message until released by, for example, an ACK. By these means, the systems and methods may provide faster and more reliable emergency communication, thereby saving lives that may otherwise have been lost. The practicality and usefulness of embodiments according to present principles will become greatly augmented with the widespread adoption of 5G and subsequent wireless generations (such as 6G and following subsequent and future technologies). Protocols for delivering emergency messages with minimal delay, such as the protocols disclosed herein, will be needed even more as congestion continues to rise in the limited bandwidth available.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A local area network (LAN), comprising a base station in signal communication with a plurality of user nodes, wherein:

each user node is configured to: detect an emergency event, determine whether a communication channel is clear, and if the communication channel is clear, transmit an emergency message to the base station;

wait, after determining that the communication channel is not clear, until the communication channel becomes clear;

then monitor the channel for a predetermined listening period; and then, if no further signals are detected during the predetermined listening period, transmit the emergency message; and wherein the emergency message indicates a location of the emergency and a type of emergency response desired.

2. The LAN of claim 1, wherein the emergency message is transmitted according to 5G or 6G technology.

3. The LAN of claim 1, wherein the location of the emergency and the type of emergency response desired are in human-readable form after demodulation and conversion to alphanumeric symbols.

4. The LAN of claim 1, wherein the predetermined listening period is shorter than a delay time that other user nodes are required to wait before transmitting.

5. The LAN of claim 1, wherein the predetermined listening period is shorter than a delay time that the base station is required to wait before transmitting.

6. The LAN of claim 1, wherein the emergency message includes a code configured to indicate:

whether medical assistance is needed;

whether police assistance is needed; and whether rescue assistance is needed.

7. The LAN of claim 1, wherein the emergency message includes a code configured to indicate:

whether the emergency involves a low risk of injury;

whether the emergency involves a likely risk of injury less severe than a loss of limb or vision;

whether the emergency involves a likely risk of severe injury comprising loss of limb or vision; and whether the emergency involves a likely risk of death.

8. The LAN of claim 1, wherein the emergency message is further configured to indicate a number of victims involved in the emergency.

9. The LAN of claim 1, wherein the emergency message is further configured to indicate whether the emergency involves hazards that first responders need to know about.

10. The LAN of claim 9, wherein the emergency message is further configured to specify the hazards that first responders need to know about.

11. The LAN of claim 1, wherein the emergency message is further configured to indicate whether a voice link is requested.

12. The LAN of claim 1, wherein the emergency message is further configured to indicate whether additional information or an additional message is available.

* * * * *